United States Patent [19]

Miyabata et al.

[11] Patent Number: 5,418,574
[45] Date of Patent: May 23, 1995

[54] VIDEO SIGNAL CORRECTION APPARATUS WHICH DETECTS LEADING AND TRAILING EDGES TO DEFINE BOUNDARIES BETWEEN COLORS AND CORRECTS FOR BLEEDING

[75] Inventors: Yoshiyuki Miyabata, Neyagawa; Hiroshi Onishi, Hirakata, both of Japan

[73] Assignee: Matsushita Electric Industrial Co., Ltd., Osaka, Japan

[21] Appl. No.: 133,202

[22] Filed: Oct. 8, 1993

[30] Foreign Application Priority Data

Oct. 12, 1992 [JP] Japan .................... 4-272679
Feb. 9, 1993 [JP] Japan .................... 5-021339

[51] Int. Cl.⁶ .................. H04N 5/208; H04N 9/68
[52] U.S. Cl. .................. 348/625; 348/253; 348/629
[58] Field of Search .............. 348/625, 628–631, 348/252, 253; H04N 9/68, 5/208

[56] References Cited

U.S. PATENT DOCUMENTS 5,124,787  6/1992  Lee et al. ................ 348/630

FOREIGN PATENT DOCUMENTS 2213282  8/1990  Japan ............. H04N 5/208

OTHER PUBLICATIONS

English Language abstract of Japanese Laid-Open Patent No. 2-213282.

Primary Examiner—James J. Groody
Assistant Examiner—Cheryl Cohen
Attorney, Agent, or Firm—Sandler, Greenblum & Bernstein

[57] ABSTRACT

A video signal correction apparatus has a memory for storing a luminance value and color difference values for each pixel in an image, a horizontal color difference correction arrangement and a vertical color difference correction arrangement. The horizontal color difference correction arrangement includes a luminance change point detector for detecting leading and trailing edges, in which an area defined between the leading and trailing edges is a boundary between two colors. The colors in a region outside the boundary and adjacent to the edges are bleeding. The color difference values further outside the bleeding region are sampled to make reference color difference value. The reference color difference value is used for replacing the color difference values in the bleeding region to eliminate or reduce the bleeding color.

20 Claims, 30 Drawing Sheets

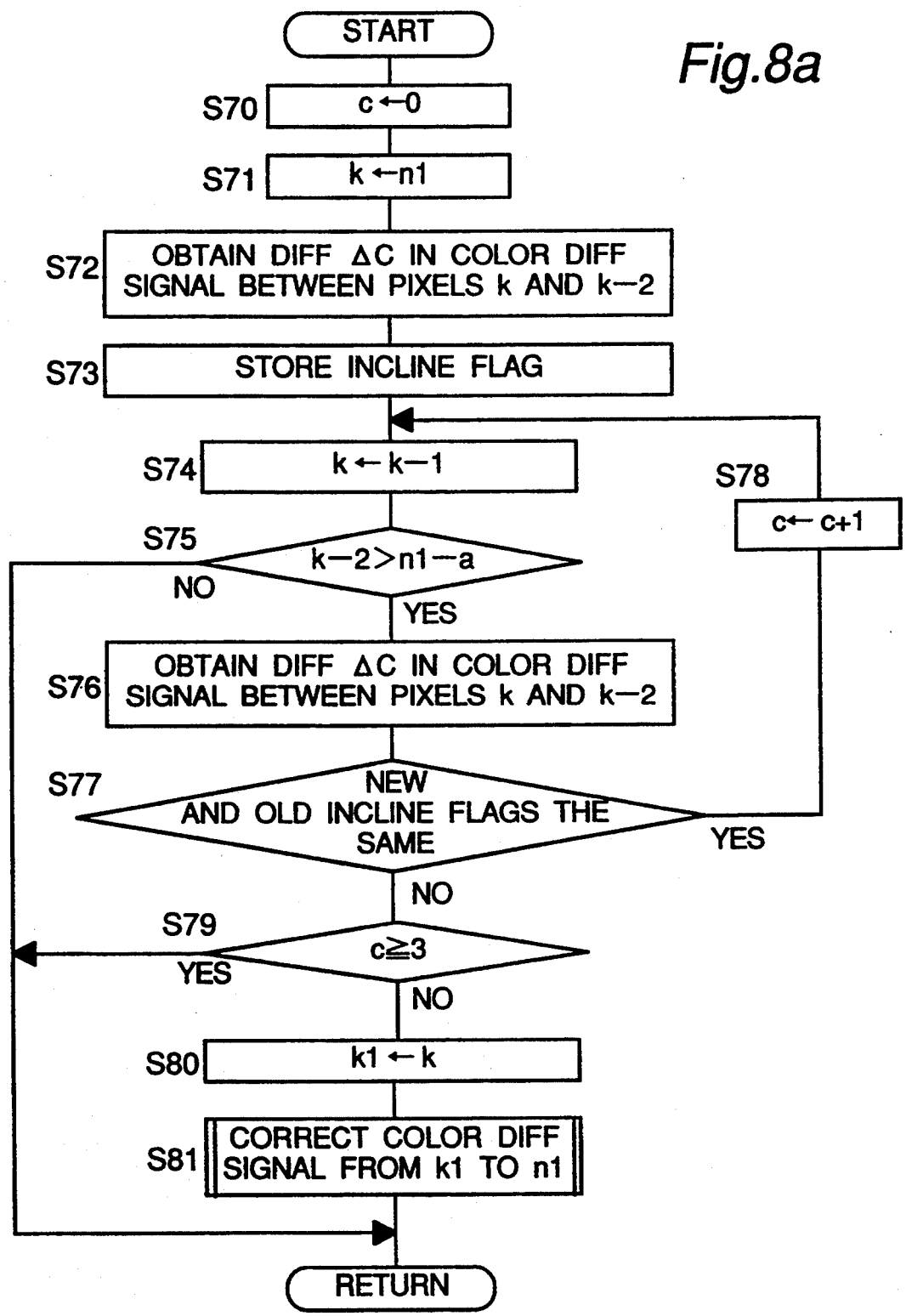

VIDEO SIGNAL CORRECTION APPARATUS WHICH DETECTS LEADING AND TRAILING EDGES TO DEFINE BOUNDARIES BETWEEN COLORS AND CORRECTS FOR BLEEDING

BACKGROUND OF THE INVENTION

1. Field of the Invention

The present invention relates to a video signal correction apparatus for improving image quality by compensating for color bleeding in video devices such as video cassette recorders, video cameras, full-color image printers, and full-color facsimile machines used to manipulate color pictures, and in data devices for storing image information on magnetic disks, optical disks, and other media.

2. Description of the Prior Art

With the development of full-color hard copy output technologies in recent years, it is quickly becoming possible to faithfully reproduce original images using such printing technologies as subliminal thermal transfer. This capability is, in turn, accelerating demand for hard-copy still image output. The development of high definition television (HDTV) and other high resolution video signal technologies, color reproduction capabilities are also now nearly comparable to traditional silver halide photographic capabilities.

When outputting hard-copy still images of current television signal formats (e.g., NTSC signals), however, the image resolution is limited by the limited bandwidth of the video signal. The resolution of the color difference signal in particular is less than ¼ that of the luminance signal. As a result, images in which there should be a color change due to a change in luminance are recorded using the color before the luminance change after the luminance changes because the change in the color difference value cannot keep pace with the change in luminance. Simply stated, images with much color bleeding are often recorded.

A method of removing this color bleeding by adding edge information from the luminance signal to the color difference signal has been proposed in Japanese patent laid-open No. 2-213282. This reference fails to teach the color bleeding correction by the use of color difference signal.

FIG. 26 is a block diagram of a conventional video signal correction apparatus for correcting color bleeding. Referring to FIG. 26, the luminance signal Y and color difference signals R-Y, B-Y output from the digital signal source 100 pass through the interface 101 and are stored in the image memory 102. The edge correction circuit 103 performs the digital processing for both vertical and horizontal aperture correction based on the luminance signal read from the image memory 102.

After edge blurring is corrected by the edge correction circuit 103, the luminance signal is output to the digital signal processor (DSP) 106, and the edge correction component is output as edge information to the adder 105. The noise component of the color difference signals R-Y, B-Y read from the image memory 102 is then reduced by the low-pass filter (LPF) 104, the edge information from the edge correction component of the luminance signal is then added by adders 105A and 105B, and the result is output to the DSP 106.

Saturation enhancement, gamma correction, and other image enhancements based on the input luminance signal and color difference signals R-Y, B-Y are applied by the DSP 106 before the digital signal is output to the printer 109. When one frame comprises two fields as in the NTSC signal format, a motion detection circuit 107 is provided between the interface 101 and image memory 102 for removal of image motion between the first and second fields. A scan line correction circuit 108 for extracting the frame image from the fields is connected to the motion detection circuit 107. The printer 109 prints the image to the desired paper or other medium based on the output signal from the DSP 106.

With this configuration, however, when the bandwidth of the color difference signal is significantly narrower than the luminance signal bandwidth as in the NTSC format, adding the edge correction component of the luminance signal to the color difference signals does not significantly correct color difference signal bleeding. In fact, image areas of differing colors occur at the edge correction area of the luminance signal, resulting in further deterioration of image quality. In addition, pseudo-edges (ghosting) can easily occur because the edge correction component is added even where the color difference signal value is constant.

SUMMARY OF THE INVENTION

Therefore, an object of the present invention is to provide a video signal correction apparatus capable of improving correction of color bleeding in images, and of suppressing image deterioration during such correction.

To achieve this object, a video signal correction apparatus according to the present invention comprises a storage means for storing the luminance value and color difference values for each pixel in an image; a luminance change point detection means to which the luminance signal generated from the stored luminance value is input for detecting the position of a pixel at at least one edge of a variable luminance area wherein the luminance value in a predetermined direction in the image increases or decreases a predetermined amount or more; a stable luminance area detection means for detecting, from the position of the detected edge pixel to the outside of the variable luminance area, a stable luminance area wherein the change in luminance is less than a predetermined luminance value; and a color difference correction means for detecting the variable color difference area wherein the color difference value in a predetermined direction of the image increases or decreases a predetermined amount within the detected stable luminance area, and correcting at least some of the color difference values in the detected variable color difference area and stored in the storage means.

By means of this configuration, the correction applied to color bleeding in an image can be improved, and image deterioration resulting during correction can be suppressed.

BRIEF DESCRIPTION OF THE DRAWINGS

The present invention will become more fully understood from the detailed description given below and the accompanying diagrams wherein:

FIGS. 8a and 8b are flow charts used to describe the process for correcting the color difference value from the leading edge point in the present embodiment.

DESCRIPTION OF PREFERRED EMBODIMENTS

First Embodiment

Figure 1:
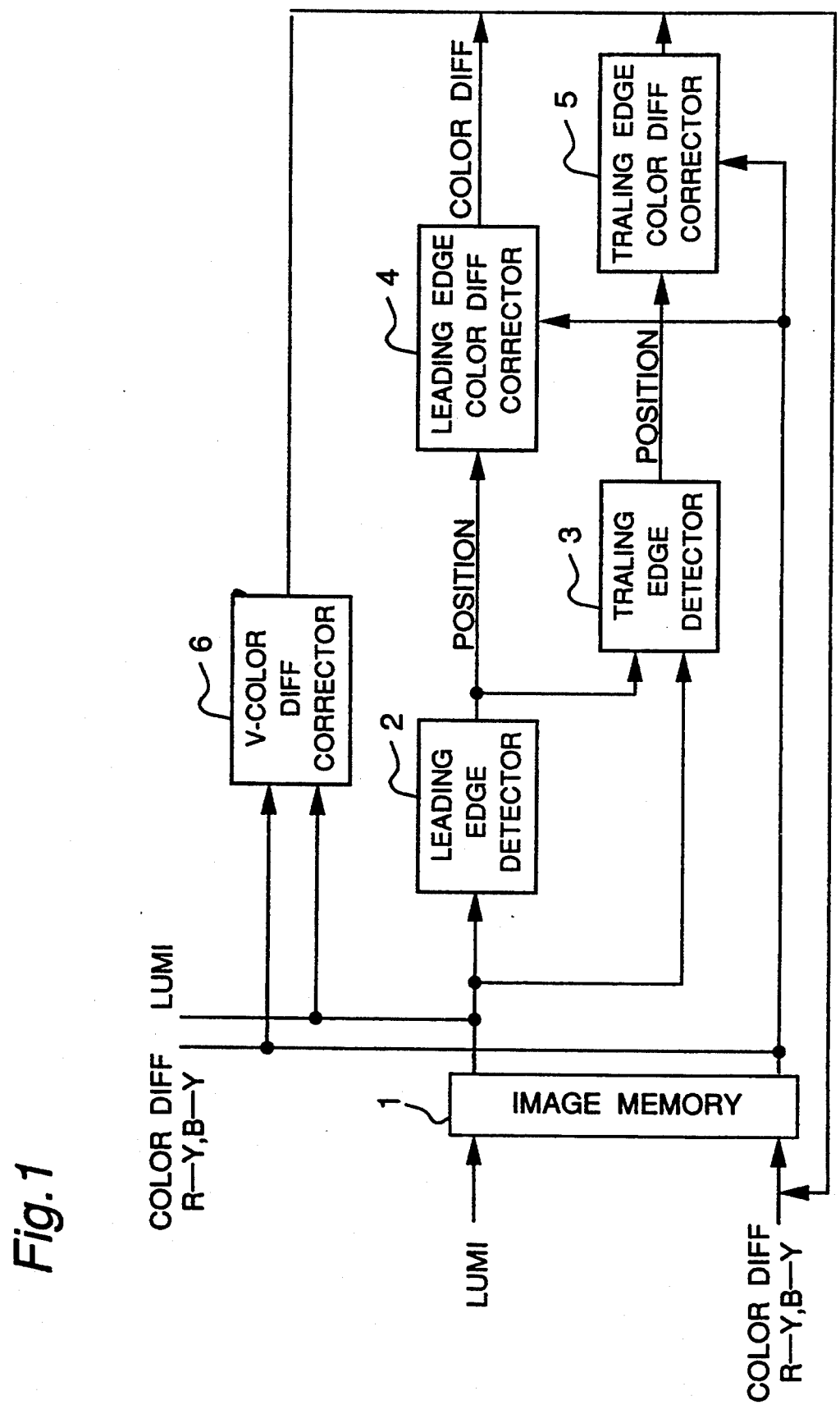
FIG. 1 is a block diagram of a video signal correction apparatus according to the first embodiment of the present invention.

The first embodiment of a video signal correction apparatus according to the invention is described below with reference to the accompanying figures, of which FIG. 1 is a block diagram.

As shown in FIG. 1, the video signal correction apparatus comprises an image memory 1, leading edge detector 2, trailing edge detector 3, leading edge color difference corrector 4, trailing edge color difference corrector 5, and vertical color difference corrector 6.

Before the description of the first embodiment proceeds, a color picture, such as a picture of white paper on the brown desk, formed on a television screen will be explained. On a television screen, the color and the brightness of an image are expressed by color difference signal (color difference value) and luminance signal (luminance value), respectively. A boundary between two colors, particularly extending in a direction intercepting the horizontal scanning direction, has a width of several pixel pitches. For example, as shown in FIG. 11a, a boundary between the white paper area and the brown desk area has a width of four pixel pitches.

Figure 11A:
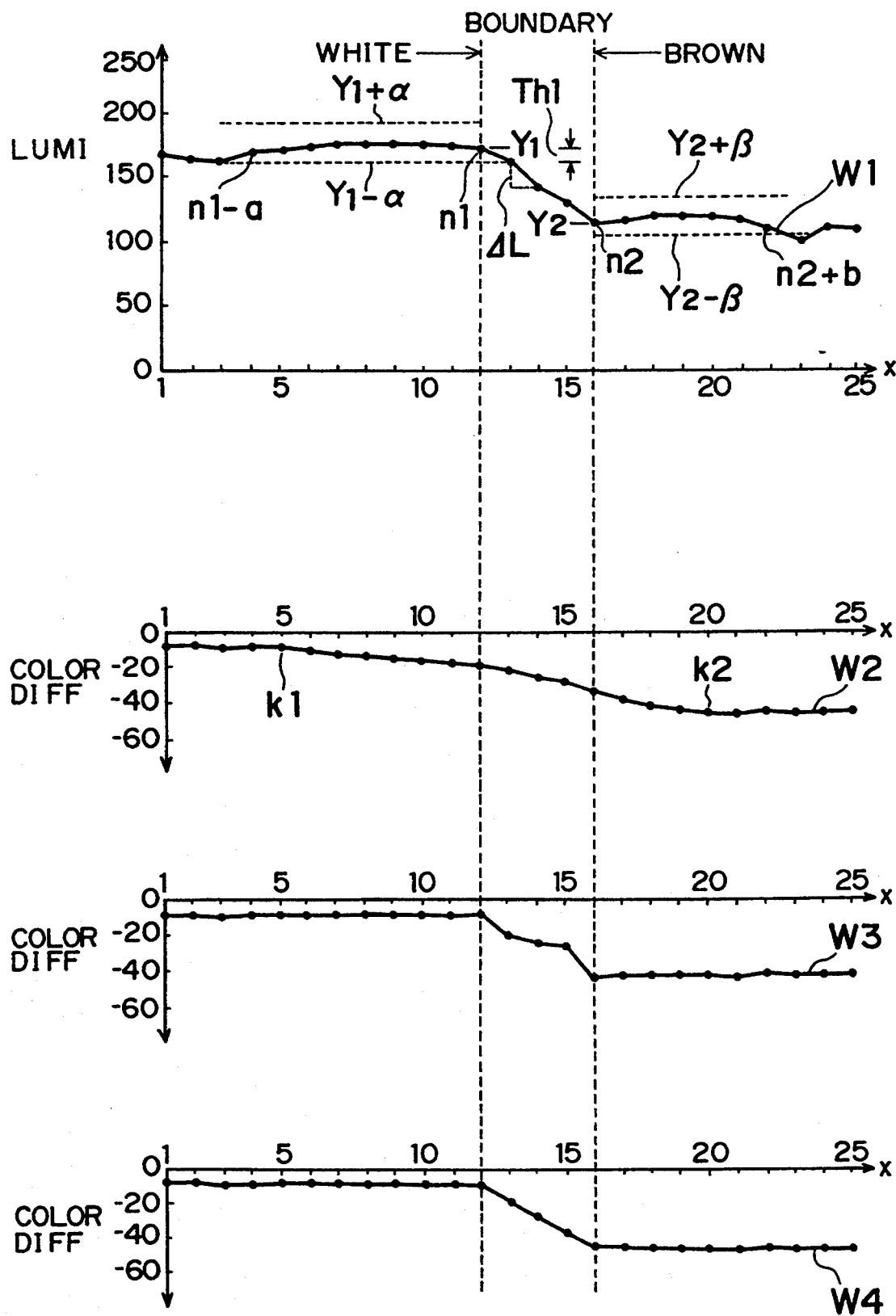
FIG. 11b is a diagrammatic view of a frame memory and a line memory.

Generally, the luminance signal makes a distinct change at the boundary area as shown by waveform W1 in FIG. 11a. More specifically, in waveform W1, the luminance signal representing the brightness of the white area makes a distinct change at a leading edge n1 of the boundary, then gradually decreases to a trailing edge n2 of the boundary, and starts representing the brightness of the brown area after the trailing edge n2. On the other hand, the color difference signal makes dull change at an area outspreading the boundary area. As shown in FIG. 11a, waveform W2, the color difference signal varies in a region from a point k1 to k2 for the change from white to brown. This region is much wider than the boundary, resulting in color bleeding around the boundary. In FIG. 11a, waveforms W3 and W4 show primary and completely corrected waveform of the color differences signal according to the present invention, as will be explained in detail later.

Figure 2:
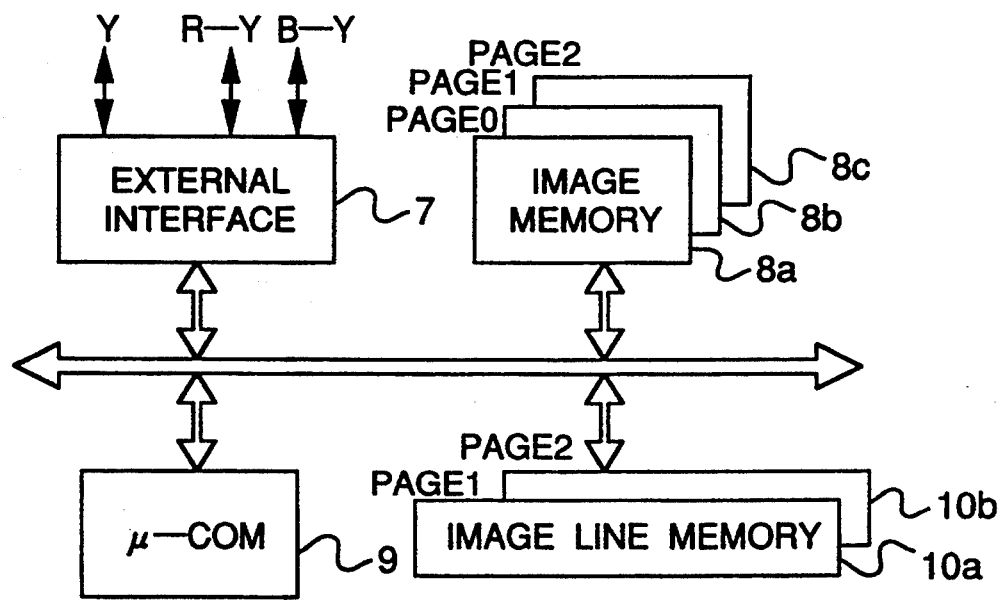
FIG. 2 is a block diagram of a video signal correction apparatus according to the present embodiment when achieved in a microcomputer.
Figure 11B:
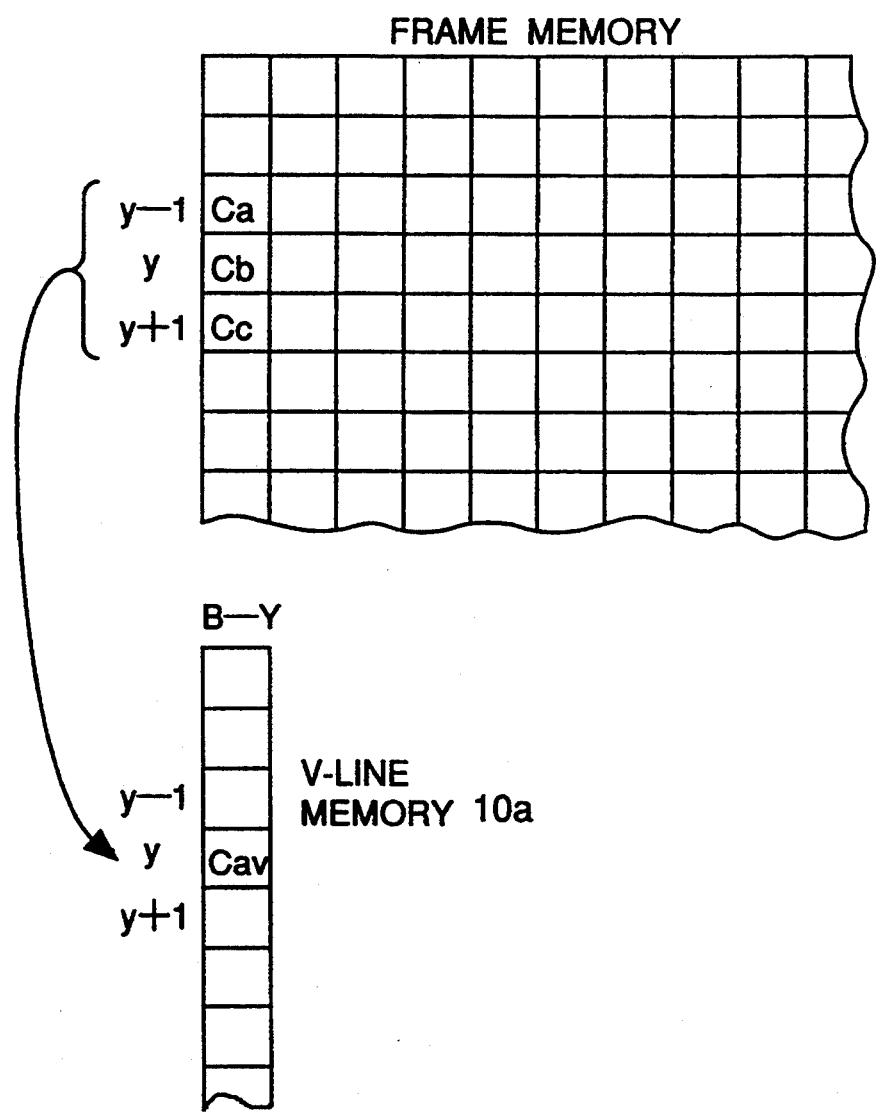

Referring back to FIG. 1, the image memory 1 stores the luminance value and the two color difference values (R-Y, B-Y) of each consecutive pixel in the horizontal scanning direction (horizontal direction) of the video signal. These values are stored in a sequence corresponding to the pixel position on a raster screen. According to the preferred embodiment, the image memory 1 has three pages of storing areas 8a, 8b and 8c, as shown in FIG. 2, and each page having a size enough to store one frame data. The three page storing areas 8a, 8b and 8c store, respectively, luminance values of one frame, first color difference values (R-Y) of one frame and second color difference values (B-Y) of one frame. The image memory 1 further has two pages of storing areas 10a and 10b, and each page having a size enough to store one vertical line data, such as shown in FIG. 11b. The two page storing areas 10a and 10b store, respectively, first color difference values (R-Y) of one vertical line and second color difference values (B-Y) of one vertical line.

The leading edge detector 2 detects the leading edge n1 of the boundary by the use of the luminance signal. At the leading edge n1, the luminance value starts to increase or decrease for two or more continuous pixels in the horizontal direction of the image.

The trailing edge detector 3 detects the trailing edge n2 of the boundary by the use of the luminance signal. At the trailing edge, the continuous increase or decrease in the luminance value ends.

The leading edge color difference corrector 4 detects a pixel position k1, from which an increase or decrease in the color difference value begins. The leading edge color difference corrector 4 also changes the color difference value for at least a portion between pixel position k1 and the leading edge n1. Pixel k1 is located before the leading edge n1, specifically between a pixel position n1−a, at which a little change in the luminance values is observed from the luminance value at the leading edge n1, and the leading edge n1.

The trailing edge color difference corrector 5 detects a pixel position k2, at which the increase or decrease in the color difference value ends. The trailing edge color difference corrector 5 also changes the color difference value for at least a portion between the trailing edge n2 and pixel position k2. Pixel k2 is located between the trailing edge n2 and a pixel position n2+b at which a little change in the luminance value is observed from the luminance value at the trailing edge n2.

The vertical color difference corrector 6 reads the luminance values and color difference values for at least three vertically aligned consecutive pixels from the image memory 1. The data stored in the image memory 1 at this time is the color difference values corrected by leading edge color difference corrector 4 and trailing edge color difference corrector 5, i.e., the color difference values corrected in the horizontal direction. One of the read three pixels, particular the center pixel of the three vertical consecutive pixels, is then defined as the target pixel, and the luminance value Yh of the target pixel is read. Then, it is tested whether or not the other two read pixels have a luminance value within a predetermined range of $Yh \pm \delta$. The read pixels which satisfies this test, as well as the target pixel, are selected. Then, the first color difference values (R-Y) of the selected pixels are averaged. The obtained average is stored in the first page vertical line storing area 10a at a position corresponding to the target pixel as a corrected first color difference value (R-Y). Thereafter, in a similar manner, the second color difference values (B-Y) of the selected pixels are averaged. The obtained average is stored in the second page vertical line storing area 10b at a position corresponding to the target pixel as a corrected second color difference value (B-Y).

The operation of the above embodiment is described below.

While reading the image luminance values in the horizontal direction form the image memory 1, the leading edge detector 2 detects the leading edge n1, at which a big change in the luminance value starts, as shown in waveform W1 in FIG. 11a, and trailing edge detector 3 detects the trailing edge n2, at which the change in the luminance value ends. If the color difference value before the leading edge n1 or after the trailing edge n2 also varies continuously, the leading edge color difference corrector 4 and the trailing edge color difference corrector 5 read the color difference values of the pixels in the horizontal direction from the image memory 1, and change the color difference values of the pixels in the area in which the color difference values vary, so as to produce waveform W3 and in turn waveform W4.

Three luminance values, i.e., the luminance value of the target pixel and the pixels immediately above and below the target pixel, are then read from the image memory 1. The vertical color difference corrector 6 then compares the luminance value of the two vertically adjacent pixels with the luminance value Yh of the target pixel, selects the pixel(s) for which the absolute value of the luminance difference is within a predetermined range $Yh \pm \delta$, and corrects the color difference of the target pixel using the color difference value of the selected pixel(s). After thus correcting the color difference of vertically adjacent pixels, the new color difference values are written back to the image memory 1.

The storage means is achieved by the image memory 1, the luminance change point detection means is achieved by the leading edge detector 2 and the trailing edge detector 3, and the stable luminance area detection means and color difference correction means are achieved by the leading edge color difference corrector 4 and trailing edge color difference corrector 5.

By applying this operation to all data within one image, a processed image in which color bleeding is reduced can be obtained.

To simplify reading the luminance values and reading and rewriting the color difference values, the image memory 1 preferably enables the pixel values (luminance and color difference) of horizontally consecutive pixels to be read continuously. If the image memory 1 does not enable the pixel values of horizontally consecutive pixels to be read continuously, a line memory can be used to temporarily store horizontally consecutive pixel values while reading the pixel values from the image memory 1.

The image memory 1 is described as formed by a page memory device capable of storing at least one full image, but can alternatively be plural line memory devices with sufficient capacity to temporarily store image signals until each process is completed.

Detection of a continuous increase or decrease in the pixel luminance values by the leading edge detector 2 and trailing edge detector 3 is possible by detecting, for example, whether the difference in the luminance values of adjacent pixels is positive or negative and is the same for two or more consecutive pixels, by detecting whether the difference in the luminance values of adjacent pixels is positive or negative and is the same for two or more consecutive pixels and the total difference is greater than a predetermined value, or by detecting whether the difference between the luminance values of consecutive pixels exceeds a predetermined threshold value for two or more consecutive pixels.

Because there is a significant overlap in signal noise in most image signals, particularly in the NTSC format, false detection of a continuous increase or decrease in the luminance value is often caused by a small noise component in the signals. Such false detection can easily lengthen the processing time. It is therefore preferable to evaluate the increase or decrease in the luminance value using three or more consecutive pixels rather than just two, or to slightly increase the setting used with the difference total or the threshold value to the difference values in the above methods.

It is also possible for the number of continuously increasing or decreasing pixels to be proportional to the magnitude of the difference in the luminance value of adjacent pixels. In this case it is possible to reduce color bleeding even when there is a gradual change in luminance rather than limiting this reduction to sudden luminance changes as above.

The pixel position n1−a at which a little change in luminance value is observed can be recognized in the leading edge color difference corrector 4 in several ways, including: reading the luminance values backward from the leading edge n1 to detect a pixel n1−a which has the absolute value of the variation of the luminance value from the leading edge n1 being greater than a predetermined threshold value; reading the luminance values backward from the leading edge n1 to detect a pixel n1−a which has a luminance value just before exceeding a predetermined range $Y1 \pm \alpha$ (Y1 is the luminance value at the leading edge n1), as shown in FIG. 11a and employed in the present embodiment, or exceeding a predetermined percentage Z% from the reference luminance Y1; or defining the pixel located at the trailing edge of a boundary immediately preceding the currently detected leading edge as the pixel n1−a.

Either the leading edge detector 2 or the leading edge color difference corrector 4 can be used to determine the area from pixel n1−a of little change in luminance to the leading edge n1.

Recognition of pixel position n2+b at which there is little change in luminance after the trailing edge n2 can be detected by the trailing edge color difference corrector 5 using a process similar to that of the leading edge color difference corrector 4. Specifically, the trailing edge color difference corrector 5 reads the luminance values forward from the trailing edge n2 to detect a pixel n2+b which has the absolute value of the variation of the luminance value from the trailing edge n2 being greater than a predetermined threshold value; reads the luminance values forward from the trailing edge n2 to detect a pixel n2+b which has a luminance value just before exceeding a predetermined range $Y2 \pm \beta$ (Y2 is the luminance value at the trailing edge n2), as shown in FIG. 11a and employed in the present embodiment, or exceeding a predetermined percentage Z% from the reference luminance Y2; or defines the pixel located at the leading edge of a boundary immediately following the currently detected trailing edge as the pixel n2+b.

Either the trailing edge detector 3 or the trailing edge color difference corrector 5 can be used to determine the area from the trailing edge n2 to pixel n2+b of little change in luminance.

Detection of a continuous increase or decrease in the color difference values by the leading edge color difference corrector 4 and trailing edge color difference corrector 5 is possible: by detecting, for example, whether the difference in the color difference values of adjacent pixels is positive or negative and is the same for two or more consecutive pixels; by detecting whether the difference in the color difference values of adjacent pixels is positive or negative and is the same for two or more consecutive pixels and the total difference is greater than a predetermined value; or by detecting whether or not the difference between the color difference values of consecutive pixels exceeds a predetermined threshold value for two or more consecutive pixels.

When the band width of the color difference signal is extremely narrow relative to the luminance signal, e.g., when detecting the increase or decrease in the color difference values in the NTSC signal with the above methods, it is preferable to evaluate the difference between pixels separated by two or more pixel pitches because of the small change in the color difference of adjacent pixels. Because noise is also contained in most image signals, and particularly in NTSC format signal, false detection of a continuous increase or decrease in the color difference is often caused by a small noise component in the signals. Such false detection can easily lengthen the processing time. To assure processing is completed in the shortest possible time, it is therefore preferable to evaluate the increase or decrease in the color difference value using three or more consecutive pixels rather than just two, or to slightly increase the setting used with the difference total or the threshold value to the difference values in the above methods.

The change in the color difference value by the leading edge color difference corrector 4 uses the color difference value of a pixel between pixel n1−a and the leading edge where the change in the color difference value is small. For example, the color difference value may be changed to the typical color difference value C1 of each pixel from k1 to k1−c ($\geq$n1−a) where the change in the color difference value is small, or to the average of the typical color difference value C1 and each color difference value.

The change in the color difference value by the trailing edge color difference corrector 5 uses the color difference value of a pixel between the trailing edge n2 and pixel n2+b where the change in the color difference value is small. For example, the color difference value may be changed to the typical color difference value C2 of each pixel from k2 to k2+d ($\leq$n2+b) where the change in the color difference value is small, or to the average of the typical color difference value C2 and each color difference value.

Typical values C1 and C2 can be any average value used in a common frequency distribution, including the additive mean, multiplicative mean, harmonic mean, median value, or modal value of the color difference values of plural selected pixels. The color difference value is preferably not changed if only one pixel is selected.

Because the vertical color difference corrector 6 must reference unprocessed pixel values from the image memory 1 for pixel processing, the vertical color difference corrector 6 also comprises a function for temporarily storing the processed pixel color difference values so that these values are not immediately written back to the image memory 1 from which the pixel values required for the next pixel processing operation are referenced. This can be achieved by providing a line memory with capacity to temporarily store processing results in the vertical direction, or plural buffers with sufficient capacity to store processing results in the vertical direction for as long as the corresponding pixel position is within the processing range.

The vertical color difference corrector 6 references three vertically consecutive pixels (including the target pixel) for color difference correction, but any other odd number of pixels, e.g., five or seven, can be alternatively referenced. In this case, however, only those pixels of which the luminance value is close to the luminance value of the target pixel and are positioned near the target pixel are selected.

Color difference correction by the vertical color difference corrector 6 may be executed more than once for the same pixel. Color noise originally occurring in the horizontal direction and color bleeding occurring when color difference correction is not completed in areas of horizontal color bleeding can be made inconspicuous by the vertical color difference corrector 6 dispersing the color difference vertically. This effect is enhanced as the number of times the same pixel is processed in the vertical direction increases, and each pixel is therefore preferably processed three or more times.

In the color difference correction process of the vertical color difference corrector 6, the pixels for which the difference in the luminance value to the luminance value of the target pixel and are vertically adjacent above and below the target pixel are selected, and the color difference values of the selected pixels are replaced by the average of the selected color difference values and the color difference value of the number h pixel. It is possible, however, to add or subtract Z% of the difference with the color difference value of the number h pixel, and substitute this value as the new number h color difference value.

By applying this color difference correction operation to all image data, the vertical color difference corrector 6 can also reduce the slight color noise created by the color bleeding process to obtain a processed image with color image quality.

FIG. 2 is a block diagram of the video signal correction apparatus shown in FIG. 1 achieved by a microcomputer.

In this microcomputer, the luminance signal Y, and color difference signals R-Y, B-Y obtained for horizontally consecutive pixels in the input video signal are input to the external interface 7 for conversion to 8-bit digital signals, and the 8-bit digitized luminance signal Y and color difference signals R-Y, B-Y are stored together with the corrected color difference values in the image memory 8.

The image memory 8 comprises a three-page storage capacity to store these various values. The luminance value and two color difference values defining one pixel in memory are obtained using the same vertical-horizontal address coordinates common to all three pages. In this embodiment, the luminance signal Y is stored to page 0, color difference signal R-Y is stored to page 1, and color difference signal B-Y is stored to page 2.

The microcomputer 9 executes the functions of the leading edge detector 2, trailing edge detector 3, leading edge color difference corrector 4, trailing edge color difference corrector 5, and vertical color difference corrector 6. Note that this microcomputer 9 comprises a CPU, ROM, RAM, and an input/output interface. The vertical color difference corrector 6 is an image line memory used as a temporary buffer for storing one vertical line of corrected color difference values.

The operation of the video signal correction apparatus thus comprised is described below with reference to the pixel matrix diagram in FIG. 3 and the flow charts in FIGS. 4–10.

Figure 3:
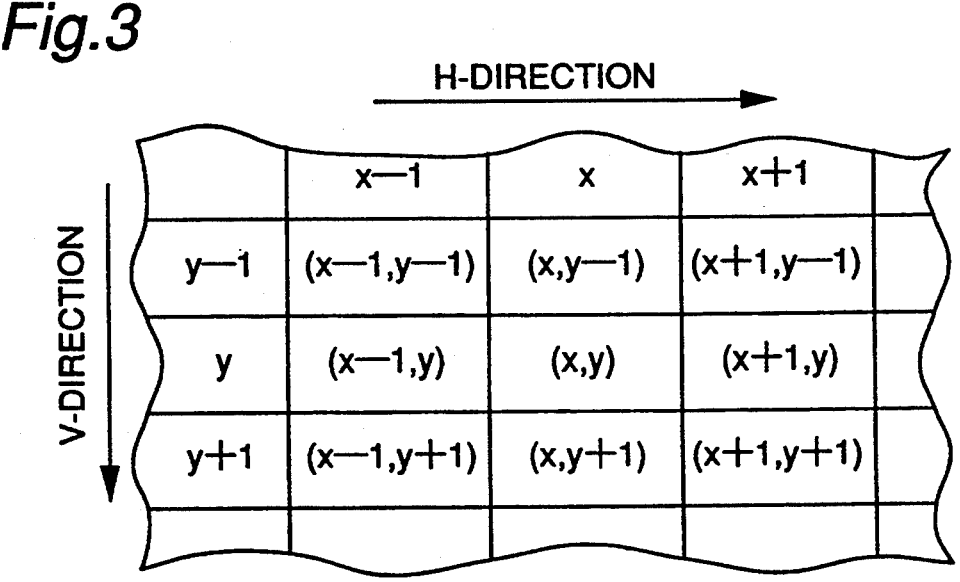
FIG. 3 is a graph used to describe the pixel position in the image memory in the present embodiment.

FIG. 3 shows the relationship between the pixel position and the pixel value storage position in the image memory 8. This addressing matrix matches the horizontal (X) axis of the image memory 8 with the horizontal scanning direction of the image signal, and the vertical (Y) axis of the image memory 8 with the sub-scanning direction. Each (x,y) value therefore identifies the position of one pixel in the image, and is the address of that pixel in the image memory 8.

Figure 4:
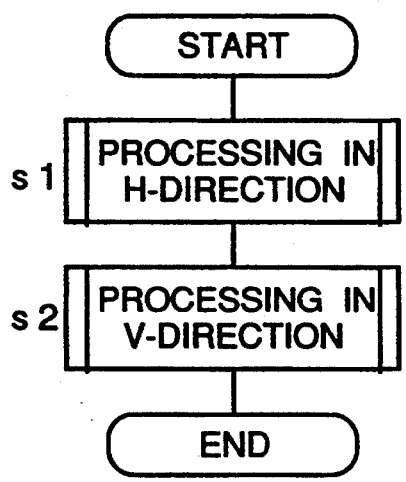
FIG. 4 is a flow chart used to describe the overall operation of the present embodiment.

FIG. 4 is a flow chart of the overall process executed by the video signal correction apparatus. As shown in FIG. 4, the first step s1 corrects the color difference values in the horizontal direction of the image to reduce color bleeding, and the second step s2 applies the process in the vertical direction, thereby reducing noise and improving the image quality in terms of picture color. Thus, the first step s1 corrects the color difference values in the horizontal direction, and the second step s2 corrects the color difference values in the vertical direction.

The horizontal color difference correction process (step s1) is described below with reference to the flow charts in FIGS. 5–9, and the vertical color difference correction process (step s2) is described below with reference to the flow chart in FIG. 10.

Figure 5:
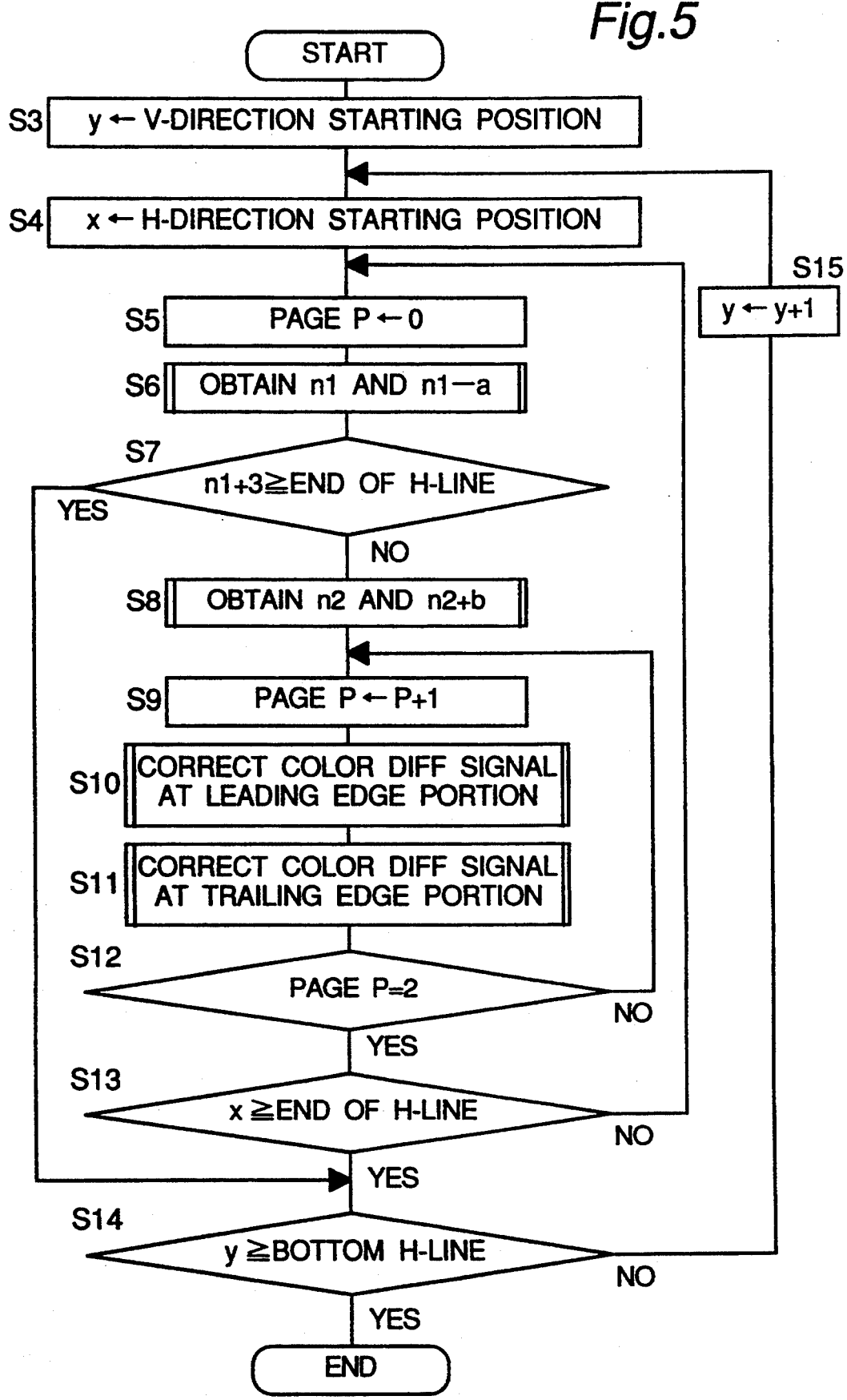
FIG. 5 is a flow chart used to describe the operation for correcting the color difference value in the horizontal direction of the image according to the present embodiment.

The overall horizontal color difference correction process is shown in FIG. 5, each step of which is described below.

In step s3, the position of the pixel at which processing in the vertical direction starts is set in the image memory 8.

In step s4, the position of the pixel at which processing in the horizontal direction starts is set in the image memory 8. Steps s3 and s4 are necessary when a window is set for designating an area in which the boundary lines should be corrected.

In step s5, the page number is set (to page 0 in this embodiment) for reading the luminance values from the image memory 8.

In step s6, the luminance values are sequentially read from the image memory 8, and the position of pixel n1 at the start of the current luminance value edge, and the area of minimal change in the luminance value before the leading edge pixel n1 are obtained. This step corresponds to the process executed by the leading edge detector 2 in FIG. 1.

In step s7, it is determined whether a pixel which is three pixels ahead of the detected leading edge n1 (i.e., n1+3) is ahead of the end point of the pixels in the horizontal direction, i.e., ahead of end of the H-line. If this pixel exceeds the horizontal end point, the end point cannot be detected, and the color difference value is therefore not corrected.

In step s8, luminance values are again read from the image memory 8 to find the end of the luminance value edge, and the pixel position n2 of this edge and the area of minimal change in the luminance value after the trailing edge pixel are obtained. This step corresponds to the process executed by the trailing edge detector 3 in FIG. 1.

In step s9, the page number is changed in the image memory 8 to read the color difference values. The new page number is set to read either of the color difference value R-Y or B-Y.

In step s10, the color difference value of the pixels in the area of minimal change in the luminance value obtained in step s6 is read from the same address in the image memory 8. Pixel k1 (the pixel from which an increase or decrease in the color difference value continuous to the leading edge begins) is detected, and the color difference values from the pixel k1 to the leading edge n1 are corrected and the corrected color difference values are written back to the image memory 8. This step corresponds to the process executed by the leading edge color difference corrector 4 in FIG. 1.

In step s11, the color difference value of the pixels in the area of minimal change in the luminance value obtained in step s8 is read from the same address in the image memory 8. Pixel k2 (the pixel at which the continuous increase or decrease in the color difference value ends) is detected, and the color difference values from the trailing edge point to pixel k2 are corrected and written back to the image memory 8. This step corresponds to the process executed by the trailing edge color difference corrector 5 in FIG. 1.

In step s12, it is determined whether to change the page in the image memory 8 to correct each of the color difference values R-Y, B-Y.

In step s13, it is determined whether processing of one complete horizontal line in the image has been completed. If one line has not been completely processed, the process loops back to step s5 to correct the color difference values for all pixels in one horizontal line.

In step s14, it is determined whether processing of one frame, i.e., to the bottom horizontal line in the image has been completed. It is therefore determined whether the video signal correction process has been completed for the entire image by evaluating the y coordinate. If the entire image has not been processed, the vertical address coordinate y is incremented by one (step s15), and the process loops back to step s4.

Figure 6:
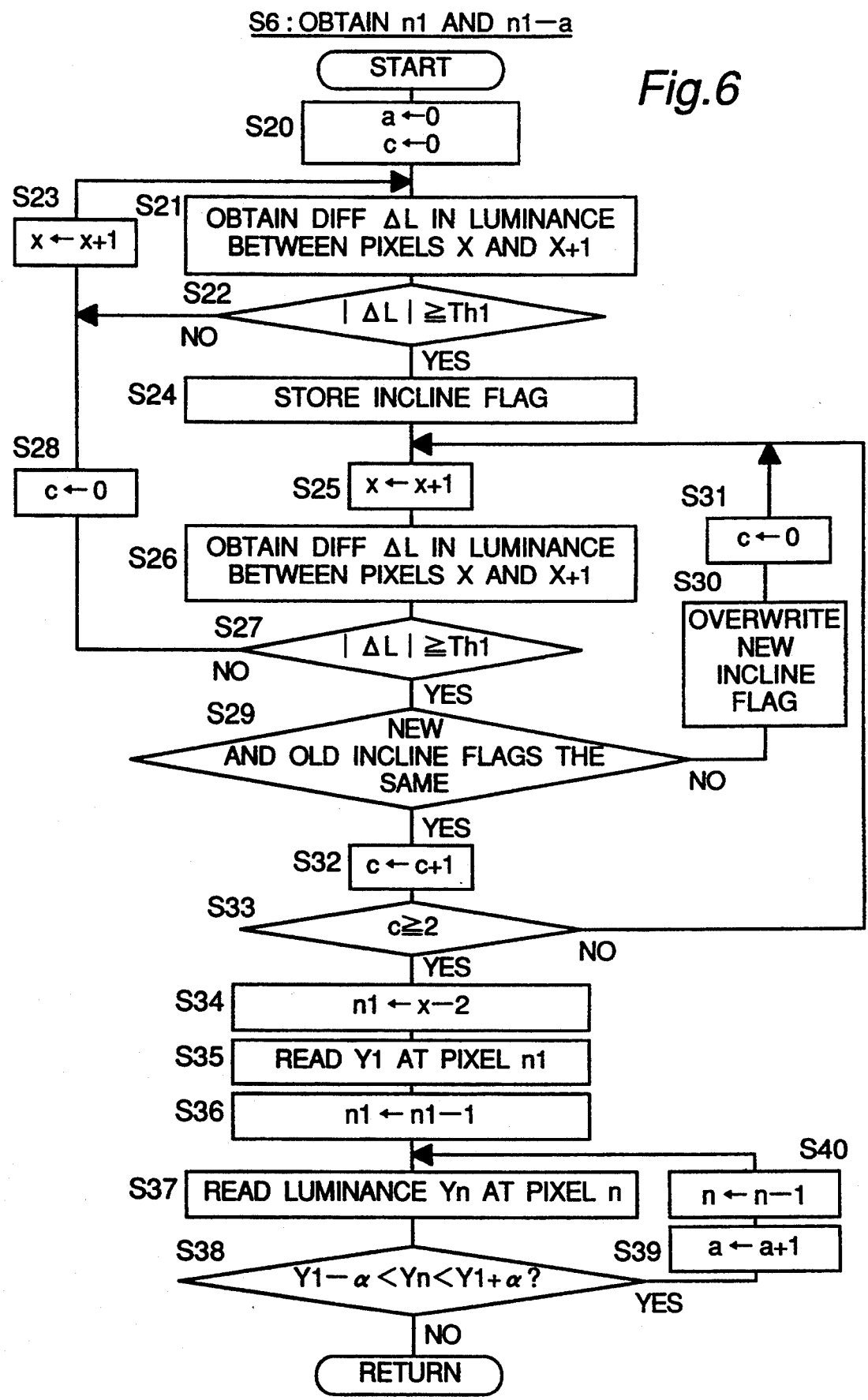
FIG. 6 is a flow chart used to describe the leading edge pixel detection operation in the present embodiment.

Referring to FIG. 6, the process executed to obtain pixel n1 at the leading edge of the luminance value (i.e., step s6 in the FIG. 5 flow chart) is shown. This process starts at step s20 by initializing variables c and a. Variable c is used to count the number of pixels through which there is a continuous increase or decrease in the luminance value. Variable a is used to count the number of pixel positions from the leading edge pixel n1 to a pixel which is traced backwards from the pixel n1 and the one located furthermost from the pixel n1, but within a predetermined luminance range $Y1 \pm \alpha$, wherein Y1 is the luminance value of the leading edge pixel n1 and $\alpha$ is a predetermined value. Variable a therefore represents the number of pixels assumed to have a luminance value within a predetermined tolerance range, i.e., a stable luminance value. In the example shown in FIG. 11a, the variable a is 8 (=12−4).

In step s21, a difference $\Delta L$ (FIGS. 11a) in the luminance value of the process pixel at coordinate x and the adjacent pixel at coordinate x+1 is obtained. If the absolute value of the difference $|\Delta L|$ is greater than a predetermined threshold value Th1, step s22 defines these pixels as pixels of increasing or decreasing luminance. If the difference is less than the threshold value Th1, step s22 loops to step s23 where the process pixel is redefined to pixel coordinate x+1. This loop is repeated until step s22 returns a TRUE result, that is until x=12 in FIG. 11a is obtained.

If the evaluated pixels are determined in step s22 to have an increasing or decreasing luminance value, the sign of the difference is stored to an incline flag in step s24. For example, if the difference $\Delta L$ is plus, indicating the increase of the luminance value, the incline flag is set to "1", and if the difference $\Delta L$ is minus, indicating the decrease of the luminance value, the incline flag is set to "0". The incline flag is used to determine whether the luminance value is continuously increasing or decreasing.

In step s25 the process pixel position is shifted one pixel to the right by incrementing x, and the difference $\Delta L$ in the luminance values of the process pixel at coordinate x and the adjacent pixel at coordinate x+1 is obtained in step s26. The same comparison of $|\Delta L|$ with the threshold value Th1 performed in step s22 is executed in step s27. If the difference $|\Delta L|$ is less than the threshold value Th1, the process loops through step s28, which resets the variable c counting the number of continuously increasing or decreasing pixels to zero. The position of the process pixel is then incremented again in step s23, and step s21 is repeated. This process of counting the number of continuously increasing or decreasing pixels is thus repeated until the absolute value of the luminance value difference $|\Delta L|$ is greater than or equal to the threshold value Th1 in step s27.

When step s27 returns TRUE, the sign of the difference $\Delta L$ is obtained in step s29, and this sign is used for obtaining a new incline flag which is compared with the previously stored incline flag.

If the new and old incline flags are different, it is known that the continuous increase or decrease in the luminance value has stopped, and the incline flag is therefore overwritten in step s30 to the new incline flag as obtained in step s29. The variable c counting the number of continuously increasing or decreasing pixels is therefore reset to zero, and the process loops back to step s25.

If the new and old incline flags are the same, however, it is known that the luminance value continues to increase or decrease. The variable c counting the number of continuously increasing or decreasing pixels is therefore incremented one in step s32.

When the value of c is greater than or equal to two (step s33), it is known that the increase or decrease in the luminance value continues through at least three pixels. The counting loop is therefore ended. If $c<2$, however, the loop continues from step s25. To optimize the processing time, this embodiment thus detects whether the increase or decrease in the luminance value continues for three pixels.

When $c \geq 2$, the leading edge n1 is set to pixel position $(x-2)$. The next step is to determine for how many pixels adjacent to this pixel the luminance value is stable.

The luminance value Y1 of this leading edge pixel n1 is therefore obtained at step s35.

In step s36, the process pixel n is set to $n1-1$ which is one previous pixel to the leading edge pixel n1.

In step s37, the luminance value Yn of the pixel n is read from memory.

In step s38, it is determined whether the read luminance value Yn is within the range $Y1 \pm \alpha$.

If the luminance value Yn is within the range $Y1 \pm \alpha$, variable a, which counts the number of pixels satisfying the test in step s38, is incremented one, the position of the process pixel is shifted back one pixel $(n=n-1)$, and the loop counting the number of stable pixels a is repeated from step s37.

If, however, the luminance value is not within the range $Y1 \pm \alpha$, this process is terminated, and the leading edge pixel n1 and the pixel $(n1-a)$ at the edge of area determined to be of a stable luminance value are set.

Figure 7:
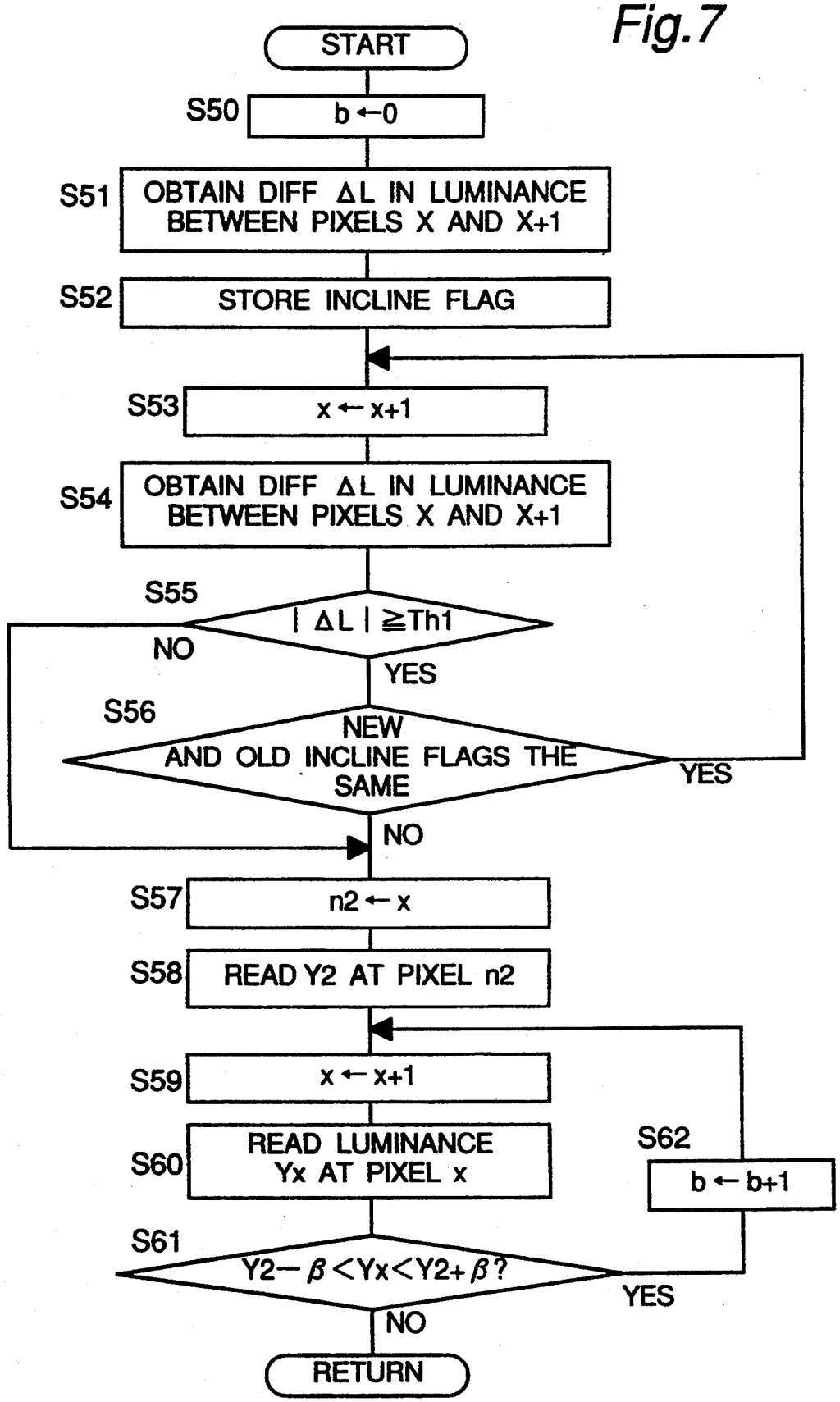
FIG. 7 is a flow chart used to describe the trailing edge pixel detection operation in the present embodiment.

Referring to FIG. 7, the process executed to obtain pixel n2 at the end of the variable luminance value range (i.e., step s8 in the FIG. 5 flow chart) is shown. This process starts at step s50 by initializing variable b, which is used to count the number of pixel positions from the trailing edge pixel n2 to a pixel which is traced forward from the pixel n2 and the located furthermost from the pixel n2, but within a predetermined luminance range $Y2 \pm \beta$, wherein Y2 is the luminance value of the trailing edge pixel n2 and $\beta$ is a predetermined value. Variable b therefore represents the number of pixels assumed to have a luminance value within a predetermined tolerance range, i.e., a stable luminance value. In the example shown in FIG. 11a, the variable b is 6 ($=22-16$).

In step s51, a difference $\Delta L$ in the luminance values between the process pixel x and the adjacent pixel $x+1$ is obtained, and the incline flag representing the sign of the difference is stored at step s52. This flag is used to determine whether the luminance value is continuously increasing or decreasing.

In step s53, the process pixel position is shifted one pixel to the right, and the difference $\Delta L$ in the luminance values of the process pixel at coordinate x and the adjacent pixel at coordinate $x+1$ is obtained in step s54.

If the absolute value of the difference $|\Delta L|$ is greater than or equal to the threshold value Th1, the process pixel is defined as one of the pixels with a continuously increasing or decreasing luminance value. If the difference is less than the threshold value Th1, the continuous increase or decrease in the luminance value is determined to have ended.

When step s55 returns TRUE, the new incline flag obtained in step s56 is compared with the old incline flag stored in step s52. If the new and old incline flags are identical, the process loops back to step s53 to further determine if the increase or decrease in luminance value continues at the next pixel. If the old and new flags are different, it is known that the continuous increase or decrease in the luminance value has stopped, and the position of the current process pixel x is defined as the trailing edge point n2.

The following process then determines the number of pixels b continuous from the trailing edge point n2 for which the luminance value is stable, i.e., within the predetermined range.

This loop starts by obtaining the luminance value Y2 of the trailing edge point n2.

At step s59, the current process pixel x is shifted one pixel to the right, and the luminance value Yx of the new pixel x is obtained in step s60.

It is determined whether this luminance value Yx is within the range $Y2 \pm \beta$ in step s61. If the result is TRUE, the counter b is incremented in step s62, and the loop returns to step s59.

If, however, this luminance value Yx is not within the range $Y2 \pm \beta$, the loop ends, and the trailing edge point n2 and number of pixels b considered to be of a stable luminance value are set.

Referring to FIG. 8a, the process executed to correct the color difference signal at the leading edge portion (i.e., step s10 in FIG. 5) is shown.

This process starts at step s70 by initializing variable c, which is used to count the number of pixels through which there is a continuous increase or decrease in the color difference value.

At step s71, the pixel position k of this process is set to the leading edge pixel n1.

In step s72, the difference $\Delta C$ in the color difference signals between the pixel k (leading edge pixel n1) and the pixel $k-2$ which is two pixel spaced from pixel k in the direction towards $n1-a$ is obtained. Here, the color difference signals from two pixels which are not adjacent to each other but are spaced two pixels are obtained for calculating the difference $\Delta C$ therebetween, because the difference $\Delta C$ would be too small to evaluate if the signals from adjacent two pixels are calculated. Then, in step s73, an incline flag is stored according to the sign of the difference $\Delta C$. The incline flag is used to determine whether the color difference value is continuously increasing or decreasing.

In step s74, the process pixel position k is shifted one pixel. In step s75, it is determined whether the pixel range is within an area of slight, smooth change in the luminance value $(n1>k-2>n1-a)$. If pixel $k-2$ is determined not to be within an area of slight, smooth change in the luminance value, the color difference value should not be corrected, because it will not be possible to determine the true color difference value.

If pixel $k-2$ is within this range (step s75), however, the difference $\Delta C$ in the color difference values of the process pixel k and the offset pixel $k-2$ is obtained in step s76. A new incline flag based on the newly obtained difference $\Delta C$ is obtained in step s77, and is compared with the stored old incline flag.

If the old and new incline flags are the same, there is a continuous increase or decrease in the color difference value. The variable c is therefore incremented (step s78), and the counting loop continues again from step s74 to determine the total number of increasing or decreasing color difference value pixels.

If the old and new incline flags are different, however, or if the difference $\Delta C$ is zero, the increase or decrease has ended. It is then determined whether variable c, which tracks the number of continuously increasing or decreasing pixels, is greater than or equal to 3. If it is, it is known that the increase or decrease in the color difference value continues through at least three pixels and the process moves to the next stage. If $c<3$, the color difference value correction process ends. This embodiment thus detects whether the increase or decrease in the color difference value continues for three pixels.

When $c \geq 3$, in step s80, currently obtained k is set to the pixel position k1 representing the end of the area in which the color difference value should be changed, and the color difference values from pixel position k1 to the leading edge n1 are corrected in step s81. In this example the color difference values of the pixels from pixel position k1 to the leading edge n1 are changed to the average color difference value from pixel k1 at the end of the continuous increase or decrease in the color difference value to the end point n1−a of the smooth luminance area. In other words, the additive mean is used as the typical value C1 of the color difference values from pixel k1 to the end point n1−a of the smooth luminance area.

Figure 8B:
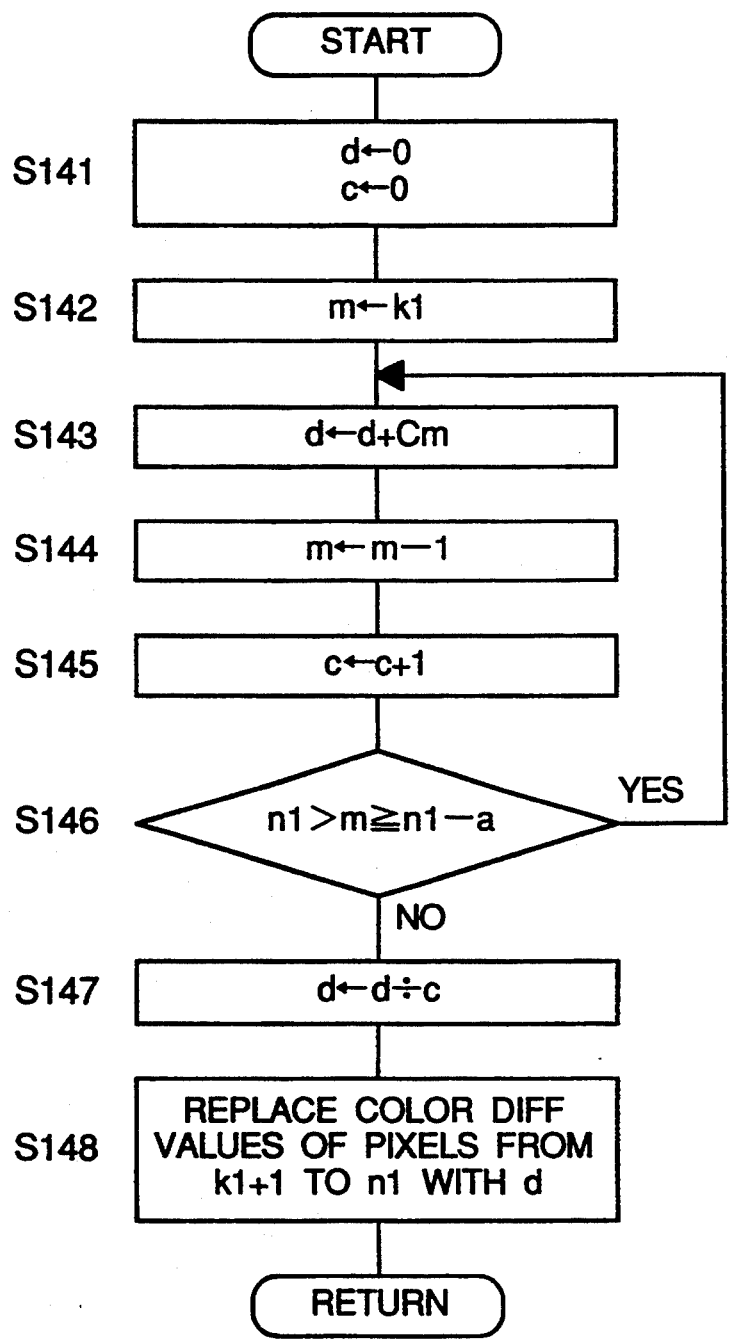

Referring to FIG. 8b, a detail of step S81, i.e., the step for correcting the color difference values from pixel position k1 to the leading edge n1 is shown.

This process starts at step s141 by initializing variables c and d. Variable c is used to count the number of pixels from pixel k1 to the leading edge pixel n1. Variable d is used for storing the color difference value to be replaced.

In step s142, k1 obtained in step s80 is set as m. In step s143, the color difference value Cm at pixel m is added to variable d. In step s144, the processing pixel m is shifted to one adjacent pixel to the left, and in step s145 variable c is incremented. In step s146, it is detected whether the processing pixel m is within a range of stable luminance ($n1 > m \geq n1-a$), or not. If the processing pixel m is within the luminance stable range (from n1−a to n1), step s143 is carried out to accumulate the color difference value in variable d. If, however, the processing pixel m is outside the luminance stable range, the accumulated color difference value in variable d is divided by variable c in step s147 to obtain an average color difference value among the pixels from n1−a to k1. In step s148, the color difference values of the pixels in the range from k1+1 to n1 are replaced with the average color difference value obtained in step s147.

By the above operation, the color bleeding on one side (left side) of the boundary can be eliminated or reduced. Thus, the color difference signal W3 (FIG. 11a), particularly in the left hand side of the boundary is obtained.

According to the embodiment shown in FIG. 8b, the average color difference value is obtained by taking an average of the color difference values of the pixels from n1−a to k1, but such an average color difference value can be obtained by taking an average of the color difference values of three consecutive pixels from pixel k1 counted towards pixel n1−a. In this case, the processing time can be shortened.

Figure 8C:
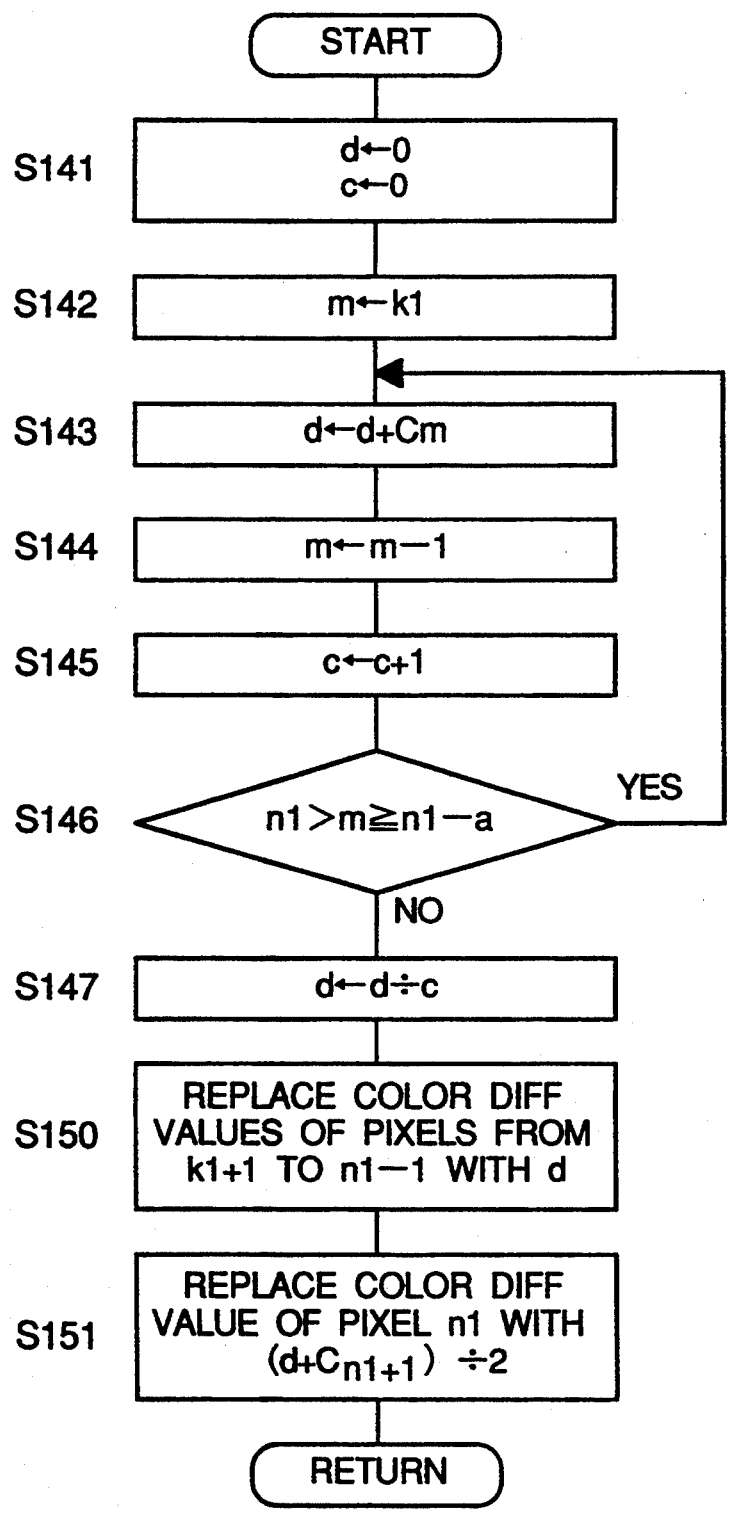
FIG. 8c is a modification of the flow chart shown in FIG. 8b, FIGS. 9a and 9b are flow charts used to describe the process for correcting the color difference value from the trailing edge point in the present embodiment.

Referring to FIG. 8c, a modification of the operation shown in FIG. 8b is shown. Instead of step s148 in FIG. 8b, steps s150 and s151 are provided in FIG. 8c. Other steps are the same. In step s150, the color difference values of the pixels in the range from k1+1 to n1−1 (instead of n1) are replaced with the average color difference value obtained in step s147, and in step s150, the color difference value of the pixel n1 is replaced with an average of two color difference values: one color difference value $C_{n1+1}$ is obtained from pixel n1+1; and the other one is the average color difference value obtained in step s147.

By this modification of FIG. 8c, the change of the color difference signal at the left side of the boundary can be smoothed to eliminate abrupt change of the color difference signal.

Figure 9A:
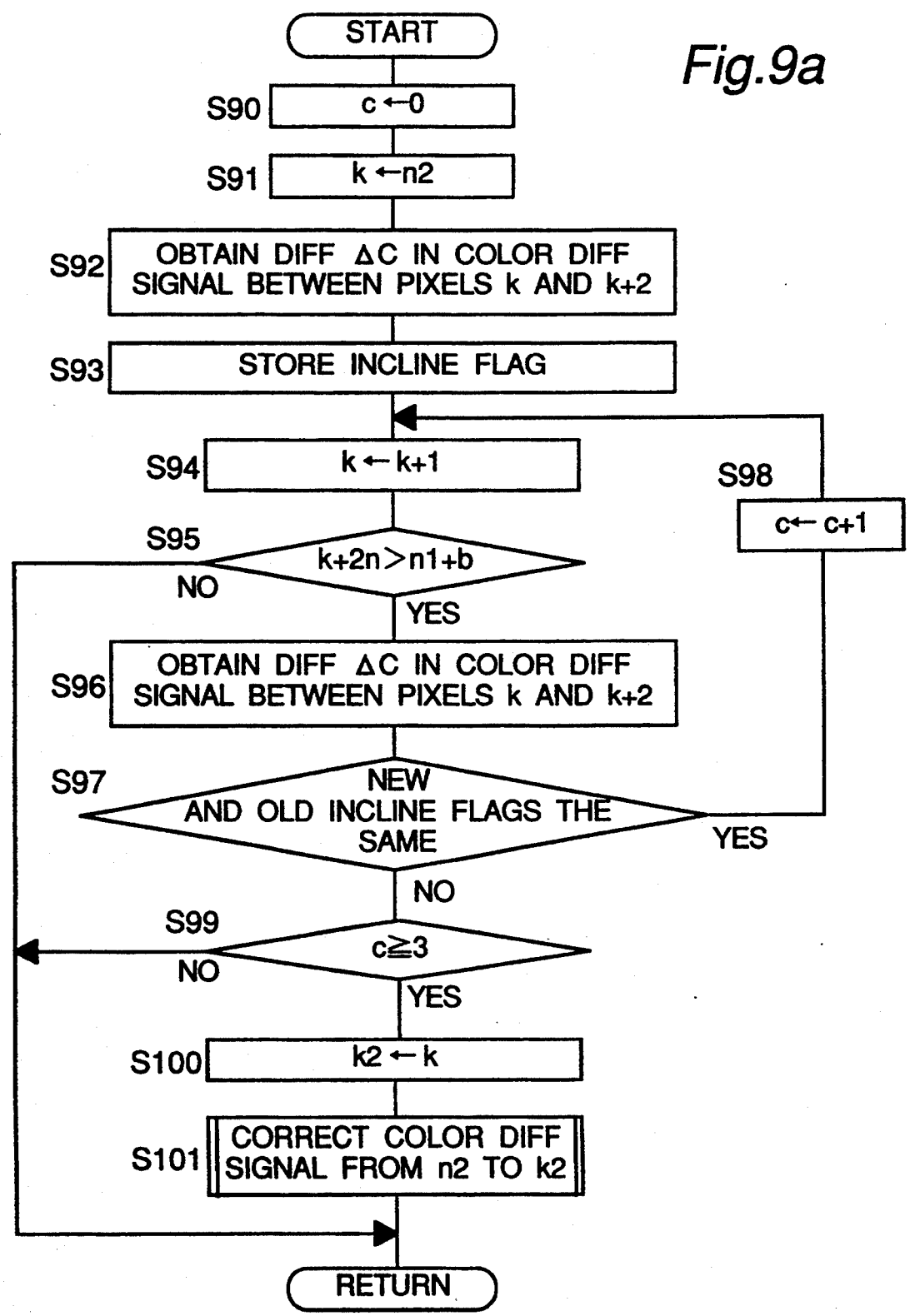
FIG. 9c is a modification of the flow chart shown in FIG. 9b.

Referring to FIG. 9a, the process executed to correct the color difference value at the trailing edge (i.e., step s11 in FIG. 5) is shown.

This process starts at step s90 by initializing variable c, which is used to count the number of pixels through which there is a continuous increase or decrease in the color difference value.

At step s91, the trailing edge pixel n2 as obtained in step s57 (FIG. 7) is set as a pixel position k for processing.

In step s92, a difference $\Delta C$ between the color difference value of the trailing edge pixel n2 and that of the pixel offset two pixels in the direction towards n2+b is obtained, and an incline flag is set and stored in step s93 according to the sign of the obtained difference $\Delta C$. The incline flag is used to determine whether the color difference value is continuously increasing or decreasing.

In step s94, the process pixel position is shifted one pixel. In step s95, it is determined whether the pixel range is within an area of slight, smooth change in the luminance value ($n2 < k+2 < n2+b$). If the pixel k+2 is determined not to be within this range, the color difference value should not be corrected, because it will not be possible to determine the true color difference value.

If pixel k+2 is within this range (step s95), however, the difference $\Delta C$ in the color difference values of the process pixel k and the offset pixel k+2 is obtained in step s96. A new incline flag based on the newly obtained difference $\Delta C$ is obtained in step s97, and is compared with the stored old incline flag.

If the old and new incline flags are the same, there is a continuous increase or decrease in the color difference value. The variable c is therefore incremented (step s98), and the counting loop continues again from step s94 to determine the total number of increasing or decreasing color difference value pixels.

If the old and new incline flags are different, however, or if the difference $\Delta C$ is zero, the increase or decrease has ended. It is then determined whether variable c, which tracks the number of continuously increasing or decreasing pixels, is greater than or equal to 3. This embodiment thus detects whether the increase or decrease in the color difference value continues for three pixels.

When $c \geq 3$, in step s100, currently obtained k is set to the pixel position k2 representing the end of the area in which the color difference value should be changed, and the color difference values from pixel position k2 to the trailing edge n2 are corrected in step s101.

If c<3, the process ends.

After correcting the color difference values in the horizontal direction, the color difference values in the vertical direction are thus corrected as described above.

Figure 9B:
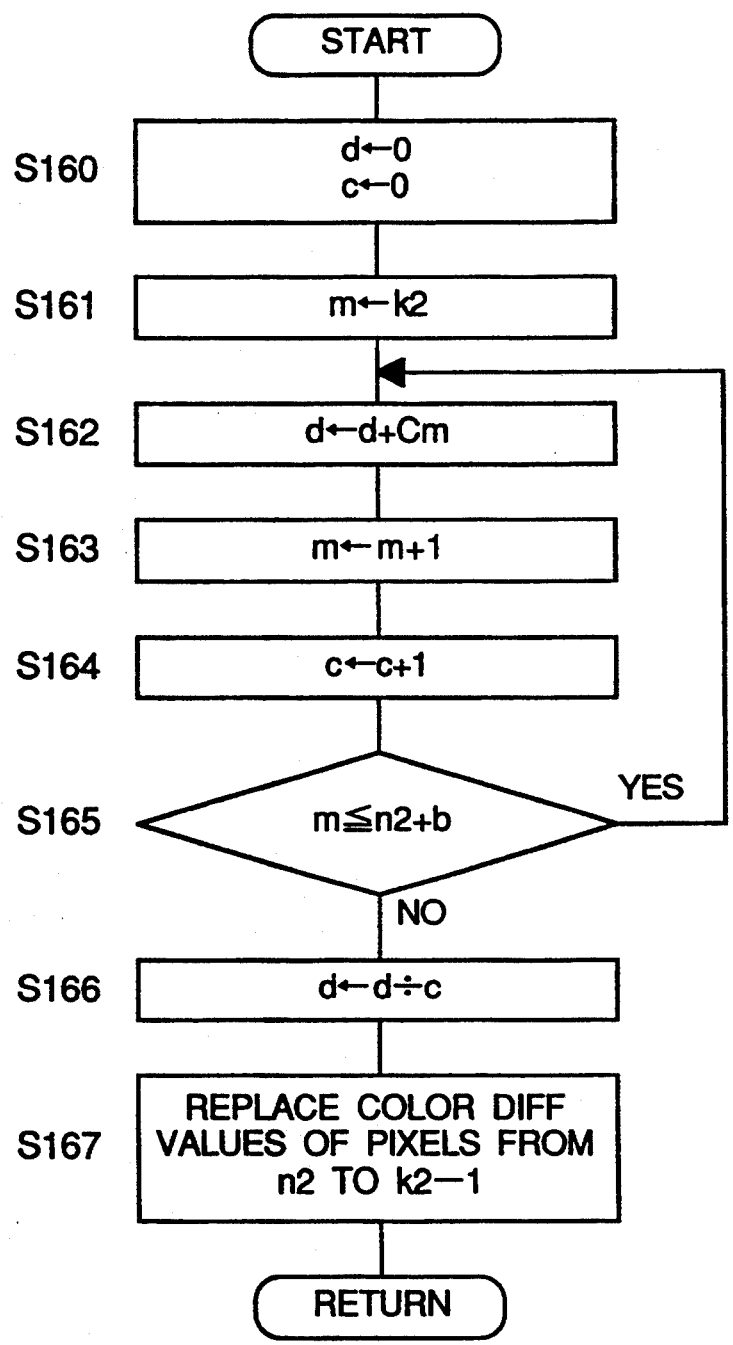

Referring to FIG. 9b, a detail of step S101, i.e., the step for correcting the color difference values from pixel position k2 to the trailing edge n2 is shown.

This process starts at step s160 by initializing variables c and d. Variable c is used to count the number of pixels from pixel k2 to the trailing edge pixel n2. Variable d is used for storing the color difference value to be replaced.

In step s161, k2 obtained in step s100 is set as m. In step s162, the color difference value Cm at pixel m is added to variable d. In step s163, the processing pixel m is shifted to one adjacent pixel to the left, and in step s164 variable c is incremented. In step s165, it is detected whether the processing pixel m is within a range of stable luminance (n2<m≦n2+b), or not. If the processing pixel m is within the luminance stable range (from n2 to n2+b), step s162 is carried out to accumulate the color difference value in variable d. If, however, the processing pixel m is outside the luminance stable range, the accumulated color difference value in variable d is divided by variable c in step s166 to obtain an average color difference value among the pixels from k2 to n2+b. In step s167, the color difference values of the pixels in the range from n2 to k2−1 are replaced with the average color difference value obtained in step s166.

By the above operation, the color bleeding on one side (right side) of the boundary can be eliminated or reduced. Thus, the color difference signal W3 (FIG. 11a), particularly in the right hand side of the boundary is obtained.

According to the embodiment shown in FIG. 9b, the average color difference value is obtained by taking an average of the color difference values of the pixels from k2 to n2+b, but such an average color difference value can be obtained by taking an average of the color difference values of three consecutive pixels from pixel k2 counted towards pixel n2+b. In this case, the processing time can be shortened.

Figure 9C:
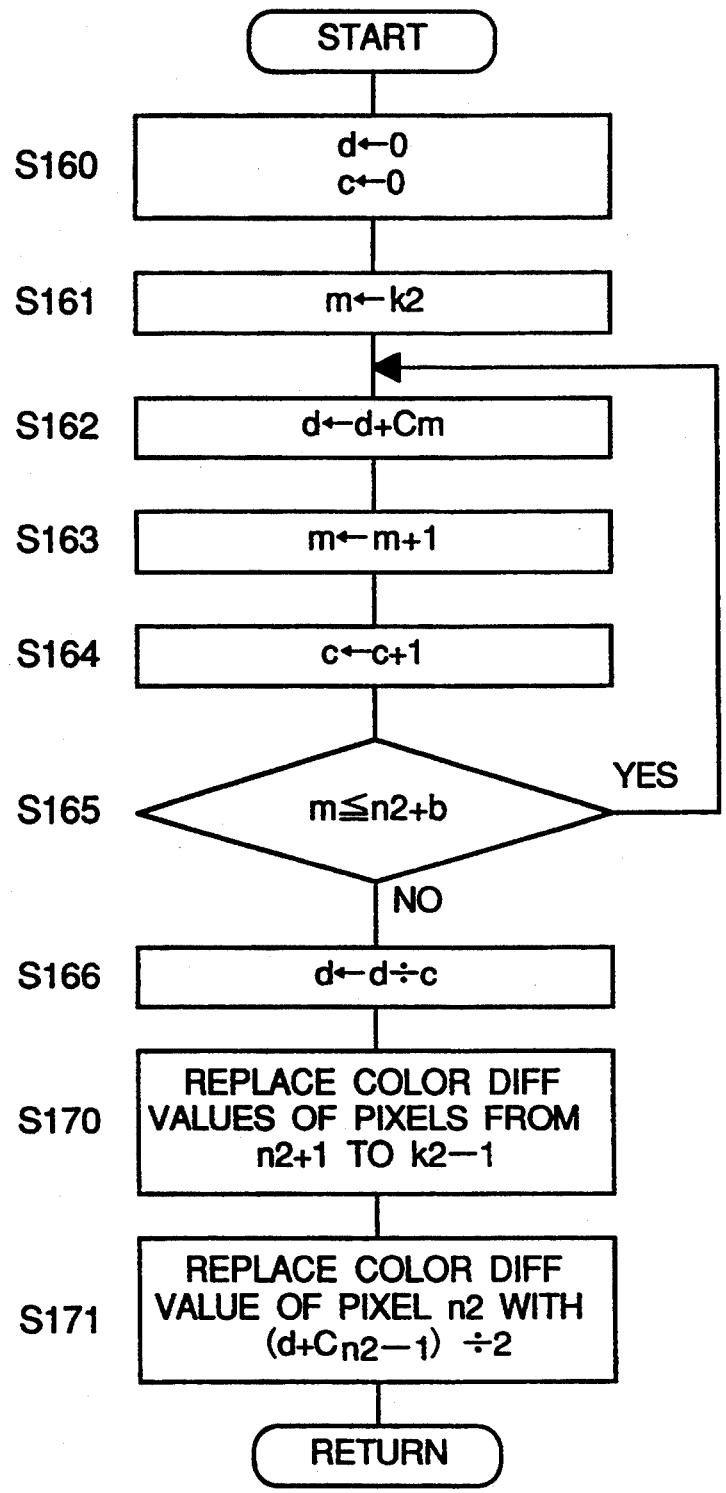

Referring to FIG. 9c, a modification of the operation shown in FIG. 9b is shown. Instead of step s167 in FIG. 9b, steps s170 and s171 are provided in FIG. 9c. Other steps are the same. In step s170, the color difference values of the pixels in the range from n2+1 (instead of n2) to k2−1 are replaced with the average color difference value obtained in step s166, and in step s170, the color difference value of the pixel n2 is replaced with an average of two color difference values: one color difference value $C_{n2-1}$ is obtained from pixel n2−1; and the other one is the average color difference value obtained in step s166.

By this modification of FIG. 9c, the change of the color difference signal at the right side of the boundary can be smoothed to eliminate abrupt change of the color difference signal.

Figure 10:
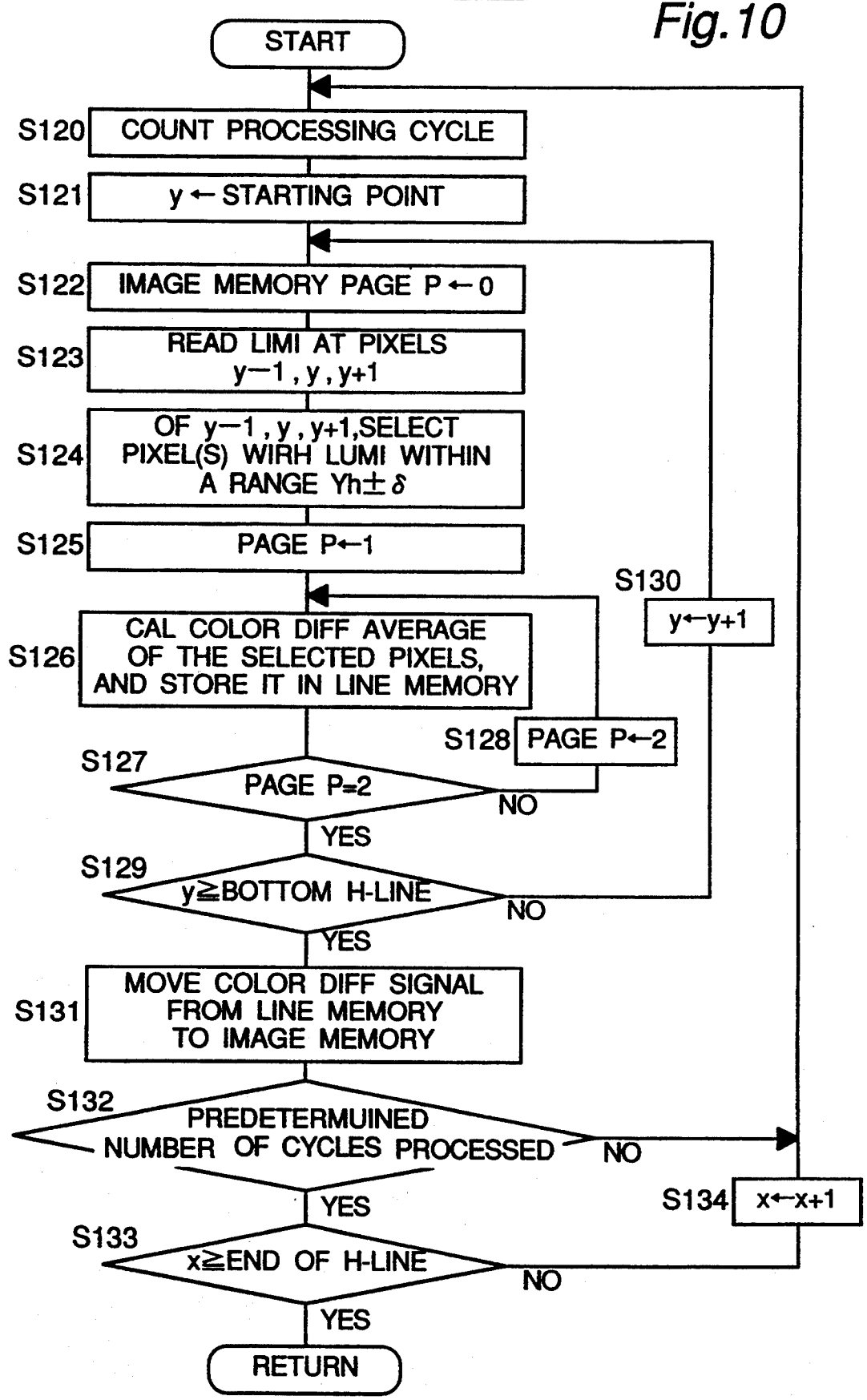
FIG. 10 is a flow chart used to describe the operation for correcting the color difference value in the vertical direction of the image according to the present embodiment, FIG. 11a show graphs in which waveform W1 is a graph of the luminance value of one horizontal line in the source image, waveform W2 is a graph of the color difference value of the same horizontal line before the correction by the present invention; and waveforms W3 and W4 are graphs of the corrected color difference values according to the present invention.

Referring to FIG. 10, a flow chart of the process for correcting the color difference values in the vertical direction of the image is shown. This process corresponds to step s2 in FIG. 4.

In this operation, three vertical pixels are read at a time to process the center one of the three vertical pixels, and is repeated plural times to cover all vertically aligned pixels.

The first step s120 is to count the number of cycles this loop is executed in the vertical direction.

The y coordinate from which this process starts is then set in step s121. This step is useful when a window is designated to indicate an area to be processed.

In step s122, the page number is set to page 0 for reading the luminance values from the image memory 8, and in step s123 the luminance values for the three vertically aligned pixels y−1, y, and y+1 are fetched from the image memory 8.

In step s124, it is determined whether the luminance values of pixels y−1 and y+1 are within the range $Yh\pm\delta$ where Yh is the luminance value of the center pixel (target pixel) y. Of the pixels y−1, y and y+1. The pixel(s) having the luminance value which falls within this range $Yh\pm\delta$ are selected. Needless to say that the target pixel y is always selected.

In step s125, the image memory 8 is changed to a page that stores the color difference values, and the line memory page is turned to page one 10a (see FIG. 2) for storing the color difference value R-Y. In step s126, an average of the color difference value, e.g., for R-Y, of the selected pixels in step s124 is calculated and is stored in line memory 10a at an area corresponding to the target pixel y. As shown in FIG. 11b, if all three pixels y−1, y and y+1 are selected, three color difference values Ca, Cb and Cc of R-Y are read from the image memory 8b and an average Cav=(Ca+Cb+Cc)/3 is calculated and is stored in line memory 10a at an area corresponding to pixel y.

If neither pixel y−1 nor y+1 was selected in step s124, the color difference value of pixel y is not changed. In this case, the existing color difference value for pixel y is directly stored in the corresponding area in the image line memory 10a.

In step s127, the memory page is checked. If step s126 has only been executed for only page one 10a for the color difference values R-Y, the page is turned to page two 10b (FIG. 2) for storing the color difference value B-Y, and the procedure loops back through step s126.

If step s126 has been executed for both of the two color difference values R-Y and B-Y, it is determined in step s129 whether the color difference correction process has been completed for all pixels in the vertical direction, i.e., to the bottom H-line, actually the penultimate H-line because the pixel in the bottom H-line can not be the center pixel of the three vertical pixels.

If the process has not been completed, the process pixel coordinate y is incremented (step s130), and the process loops back to step s122.

If the process has been completed for all pixels in the vertical direction (determined in step s129), the corrected color difference values R-Y and B-Y stored in the image line memories 10a and 10b are written back to the corresponding pixel position addresses in the image memories 8b and 8c (step s131), respectively.

In step s132 it is determined whether this correction loop has been executed the predetermined number of cycles. If not, the loop returns to step s120 to repeat the same operation to do the vertical correction operation for the required number of cycles. If it has, it is determined whether the process has been executed for the entire image. If not, the horizontal pixel position is incremented one, and the loop returns to step s120. By thus repeating this loop until the entire image is processed, color noise in the image can be reduced.

In this embodiment the color difference values from the trailing edge point n2 to pixel k2 are changed to the average color difference value calculated from pixel k2 to pixel n2+b. In other words, the additive mean is used as the typical value C2 of the color difference values from pixel k2 to the pixel n2+b.

By using a minimum luminance value of 0 and a maximum of 255, there will be 256 gradations available. Tests showed that a threshold value Th1 range from 3 to 10 is preferable in this case. This is because while the object is to find those pixels for which there is a continuous increase or decrease in the luminance value, noise typically contained in the image makes it difficult to obtain pixels of continuously increasing or decreasing luminance. To compensate for this noise component, the present embodiment defines pixels of continuously increasing or decreasing luminance as those for which the luminance value difference is outside of a predetermined value range.

Specifically, if threshold value Th1≦2, it is difficult to identify areas in which there is a continuous increase or decrease because of noise. If threshold value Th1≧11, pixels within a range of continuously increasing or decreasing luminance values are falsely determined to be pixels of a constant luminance value, and reduction of color bleeding is greatly reduced. The appropriate range for the threshold value Th1 is therefore from approximately 1% to 4% of the maximum luminance value.

It has also been shown that the appropriate range for $\alpha$ and $\beta$ is from 3 to 10. This is because while the object is to find those pixels for which there is a continuous increase or decrease in the luminance value, noise typically contained in the image makes it difficult to obtain a constant luminance value. To compensate for this noise component, the present embodiment defines pixels of constant luminance as those for which the luminance value is within of a predetermined value range.

Specifically, if $\alpha$ and $\beta$ are less than or equal to 2, it is difficult to identify pixels of constant luminance because of noise, and if greater than or equal to 11, unrelated areas in which the luminance value changes are falsely determined to be stable, leading to image quality deterioration. The appropriate range for $\alpha$ and $\beta$ is therefore from approximately 1% to 4% of the maximum luminance value.

The values of $\alpha$ and $\beta$ can also be changed proportionally to the magnitude of the luminance values Y1 and Y2. For example, $\alpha$ and $\beta$ can be set to Z% (<50%) of the luminance value, or several constants can be distributed proportionally to the luminance value.

In the correction of the color difference values, the difference between the color difference values of the target pixel and the pixels offset two pixels therefrom is obtained. This is because it is relatively difficult to discern the change in the color difference values when there is a smooth change in the color difference signal or the difference of adjacent pixels is obtained. The color difference value of the pixel offset two pixels is therefore used to make it easier to determine the increase or decrease in pixel values. It is to be noted that an offset of three pixels can also be used.

The vertical color difference corrector 6 in this embodiment executes the same process plural cycles for pixels consecutive in the vertical direction, but can also execute this process only once.

In addition, three vertically consecutive pixels are also processed at one time in this embodiment, but five or any other odd number of pixels can also be processed at a time. In addition, an asymmetrical number of vertical pixels, including an even number of pixels, may also be referenced at the top and bottom image edges because it is difficult to reference the same number of pixels above and below the target pixel.

As stated above, the minimum and maximum luminance values are set at 0 and 255, respectively, for 256 gradations, at which level a $\delta$ value range of 3-10 is preferable. This is because while the object is to find those pixels for which there is a continuous increase or decrease in the luminance value, if $\delta$ is less than 3, there will often be no pixels selected due to noise, making it difficult to efficiently smooth color noise.

In addition, if $\delta$ is greater than 10, smoothing will be applied with an area of a different color without finding the color edge even if the color changes at the luminance edge, and it will not be possible to reduce color noise. It is therefore preferable for the value of $\delta$ to be from approximately 1% to 4% of the maximum luminance value. The value of $\delta$ in this embodiment is therefore set to 8.

The number of cycles the vertical process loop is executed is from 3 to 10. This is because the object of repeating this loop is to increase the overall number of pixels referenced, and to reduce color noise. However, if the loop is executed only one or two cycles, the number of referenced pixels is small and it is difficult to reduce color noise; if the loop is executed more than ten cycles, the number of referenced pixels becomes too large, and the overall color becomes light. The number of cycles in this embodiment is therefore set to 8.

Slight color noise produced by the color bleeding process can be reduced and a processed image with good image quality can be obtained by the vertical color difference corrector 6 applying this color difference correction process to all of the image data.

In addition, the processed color difference values R-Y and B-Y are temporarily stored in the image line memories 10a and 10b, respectively, and all processed color difference values in the vertical direction are batch written to the image memories 8b and 8c after one complete line is processed in this embodiment. It is also possible, however, to use a temporary buffer to transfer the data to the image memory 8a or 8b after processing the target pixel position is completed. The image line memories 10a and 10b are used in this embodiment to simplify the description of this process.

Color bleeding can be significantly suppressed and a noticeable improvement in image quality can be obtained compared with the original image by this color difference value process. However, if the correction processes of the leading edge color difference corrector 4 and the trailing edge color difference corrector 5 are executed as above, the edge values will change more sharply than the smooth change in the color difference signal. This can result in parts of the image contours where the color changes being emphasized with a slightly unnatural image resulting.

Second Embodiment

This is compensated for in the second embodiment of the invention by using linearly interpolating the color difference values between the leading edge and the trailing edge, and substituting these interpolated values for the color difference values replaced by the average of the color difference values in the first embodiment above.

Figure 25:
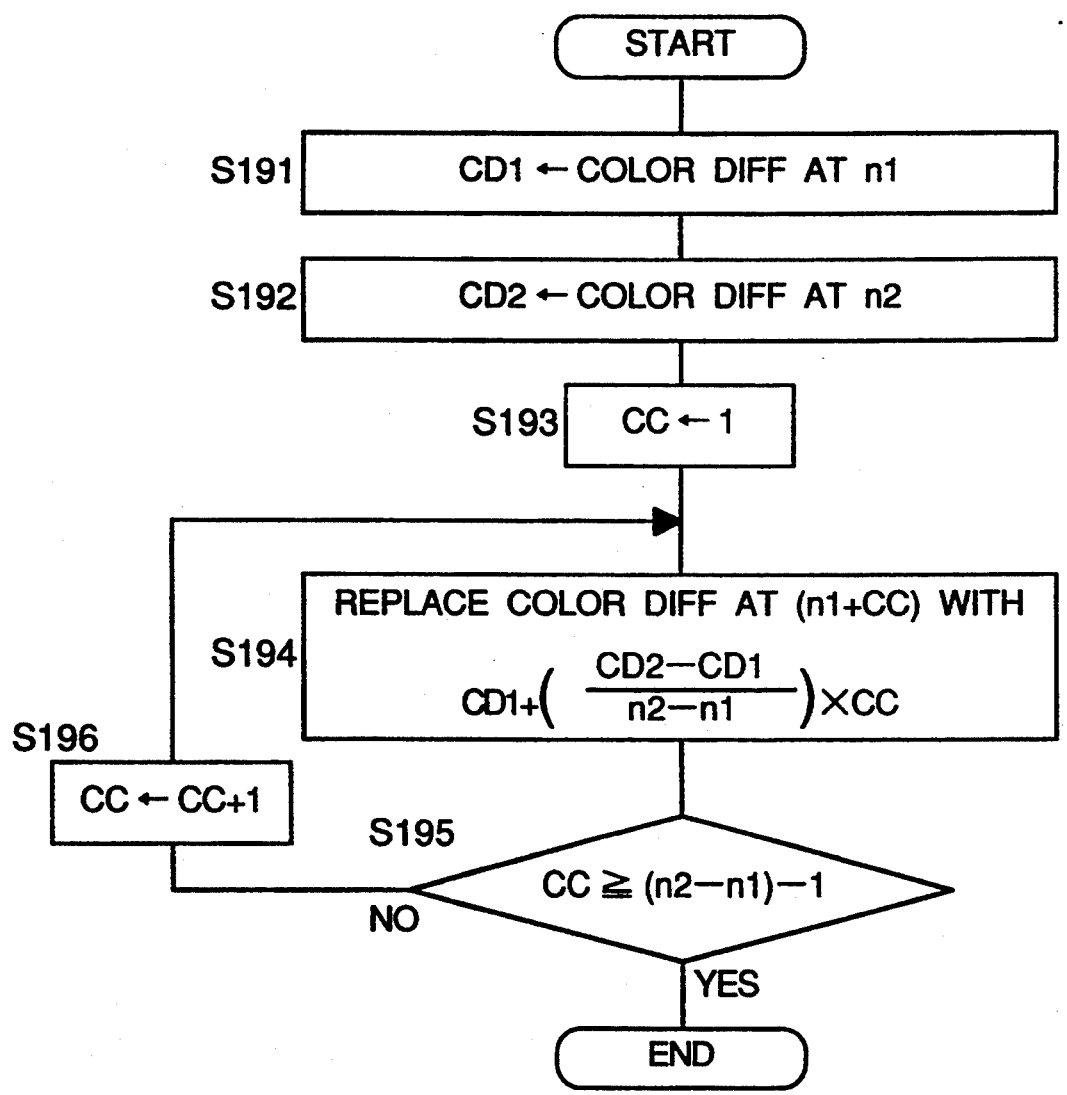
FIG. 25 is a flow chart used to describe the operation for correcting the color difference values in the boundary area.
Figure 26:
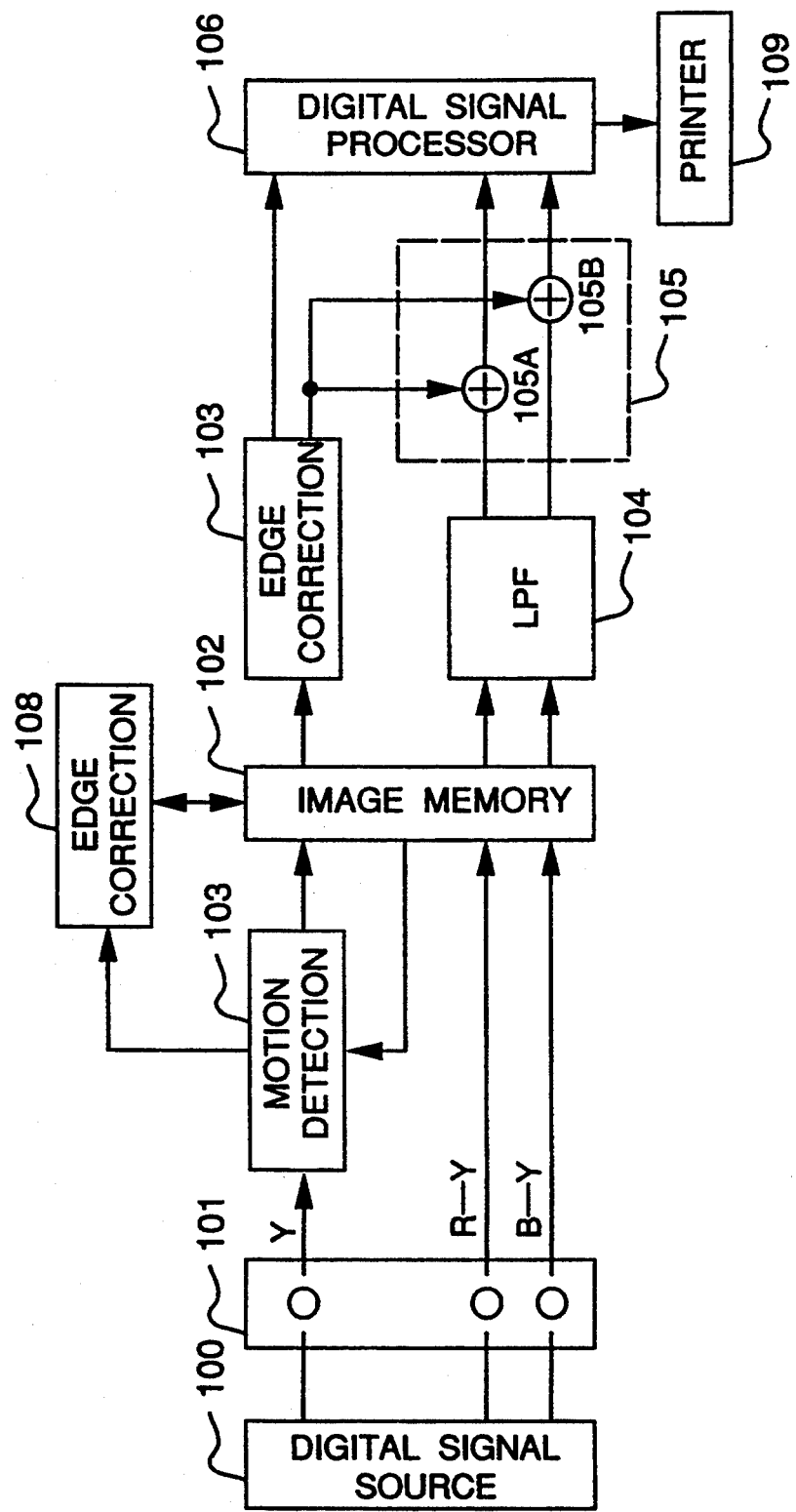
FIG. 26 is a block diagram of a prior art video signal correction apparatus.

Referring to FIG. 25, a flow chart is shown for correcting the color difference values by a linear interpolation method applied in the boundary area, i.e., between pixels n1 and n2. The flow chart of FIG. 25 is carried out after the operation of FIG. 8b or 9b is completed.

In step s191, the color difference value at the leading edge pixel n1 is read and stored as CD1, and in step s192, the color difference value at the trailing edge pixel n2 is read and stored as CD2. In step s193, a counter CC for counting the pixel position between the leading and trailing pixels n1 and n2 is reset to 1, so that the first occurring pixel from the leading edge pixel n1 will be processed first. In step s194, an interpolation color difference value is calculated by the following equation:

$$CD1+(CD2-CD1)/(n2-n1)\cdot CC$$

and the color difference value at the pixel (n1+CC) is replaced with the calculated result. In step s195, the counter CC is examined whether the counted value by the counter has reached the trailing edge pixel n2 or not, i.e., $CC \geq (n2-n1)-1$, or not. If not, counter CC is incremented in step s196. If it has, the operation stops. By this operation, the interpolation between the leading and trailing edges n1 and n2 is effected to linearly change the color difference value from the leading edge pixel to the trailing edge pixel.

Using this linear interpolation, the edge area and the color difference edge are matched and color bleeding is eliminated, there is no partial emphasis of color edges, and a natural image with good image quality can be obtained.

Table 1 shows the numeric data obtained by the correction processes of the first and second embodiments above immediately after processing the luminance signals and color difference signals of the source image in the horizontal direction. These results were obtained from tests conducted using the values $Th1=\alpha=\beta=5$. Each row in the table shows the pixel position, column A shows the number of the pixel position, column B the luminance value of the source image, column C the color difference value of the source image, column D the color difference value of the image after processing by the first embodiment above, column E the color difference value of the image after processing by the second embodiment above, and column F each pixel detected during processing. Note that while there are two color difference signals (R-Y and B-Y), only the values for color difference signal B-Y are shown because the same process is used for both color difference signals.

TABLE 1

| A Pixel position | B Bright-ness | C Color diff. | D 1st embod. | E 2nd embod. | F Relative position |
|---|---|---|---|---|---|
| 1 | 167 | −9 | −9 | −9 | |
| 2 | 164 | −8 | −8 | −8 | |
| 3 | 172 | −10 | −10 | −10 | n1 - a |
| 4 | 176 | −9 | −9 | −9 | |
| 5 | 176 | −9 | −9 | −9 | k1 |
| 6 | 176 | −11 | −9 | −9 | |
| 7 | 175 | −13 | −9 | −9 | |
| 8 | 175 | −14 | −9 | −9 | |
| 9 | 175 | −15 | −9 | −9 | |
| 10 | 175 | −16 | −9 | −9 | |
| 11 | 174 | −17 | −9 | −9 | |
| 12 | 173 | −19 | −9 | −9 | n1 (start) |
| 13 | 163 | −21 | −21 | −18 | |
| 14 | 144 | −25 | −25 | −26 | |

TABLE 1-continued

| A Pixel position | B Bright-ness | C Color diff. | D 1st embod. | E 2nd embod. | F Relative position |
|---|---|---|---|---|---|
| 15 | 131 | −27 | −27 | −35 | |
| 16 | 116 | −32 | −32 | −43 | n2 (end) |
| 17 | 117 | −36 | −43 | −43 | |
| 18 | 119 | −39 | −43 | −43 | |
| 19 | 120 | −42 | −43 | −43 | |
| 20 | 119 | −43 | −43 | −43 | k2 |
| 21 | 117 | −44 | −44 | −44 | |
| 22 | 117 | −42 | −42 | −42 | |
| 23 | 116 | −43 | −43 | −43 | n2 + b |
| 24 | 110 | −43 | −43 | −43 | |
| 25 | 109 | −42 | −42 | −42 | |

In FIG. 11a, waveforms W1-W4 are the process results shown in Table 1. The horizontal axis shows the pixel position, and the vertical axis shows the luminance value or color difference value of each pixel. Waveform W1 represents the luminance value of the source image where n1 is the leading edge of the luminance value, n2 is the trailing edge, and n1−a and n2+b are the end points of the luminance smoothing area. Waveform W2 represents the color difference values for the pixel position of a given luminance value in the source image where k1 and k2 are the ends of the color bleeding area for the color difference value. Waveform W3 shows the results of the process executed by the first embodiment, and waveform W4 shows the results of linear interpolation effected according to the second embodiment to the color difference values between the leading edge n1 and the trailing edge n2.

Rounding of the color difference values is improved in the process results shown by waveform W3, and elimination of color bleeding is demonstrated. However, there is a discontinuous change in the color difference values between the leading edge n1 and the trailing edge n2, and the color change is slightly emphasized.

By linearly connecting the color difference values between the leading and trailing edges using linear interpolation as shown by waveform W4, the change in color difference values is clarified, the edge of the color difference values is clarified, and the color difference values do not change discontinuously. As a result, color bleeding is eliminated, and at the same time, an image free of unnecessary emphasis of color change is obtained.

FIGS. 12a-12d show graphs of the experimental results of color difference correction by the vertical color difference corrector 6 after correction of the color difference values of a given image in the horizontal direction according to the second embodiment. The y-axis shows the luminance value or the color difference value of each pixel, the x-axis shows the horizontal pixel position, and the z-axis shows the vertical pixel position.

Figure 12A:
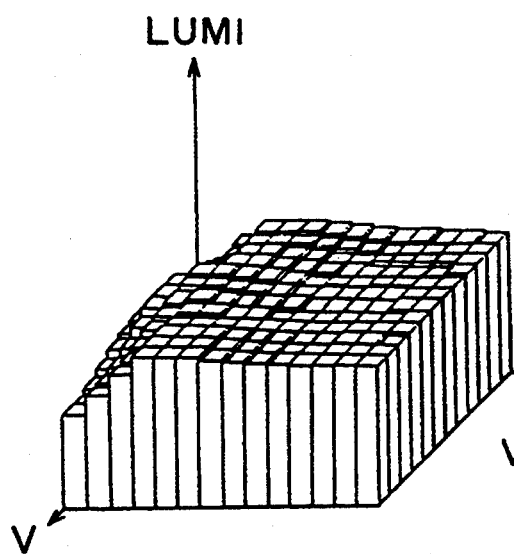
FIG. 12a is a graph of the luminance value of the source image.

FIG. 12a shows the luminance values of the source image. The trailing edge point of any given luminance value is where the luminance values are uniform (or within a specifically limited value range).

Figure 12B:
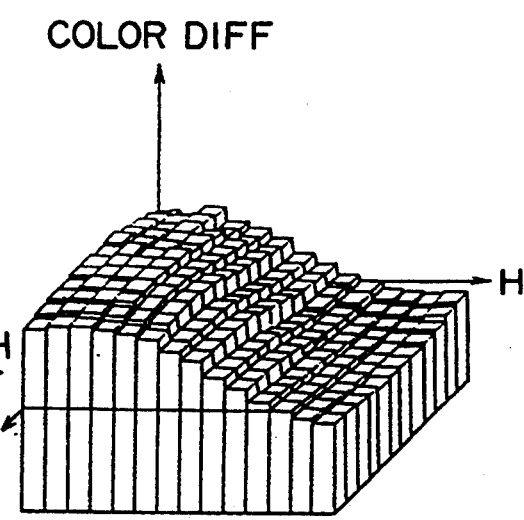
FIG. 12b is a graph of the color difference value from the same area as those shown in FIG. 12a and before the correction by the present invention.

FIG. 12b shows the color difference values for the pixel position corresponding to FIG. 12a before the correction. Note that the color difference values vary smoothly across the range of uniform luminance values in FIG. 12a.

Figure 12C:
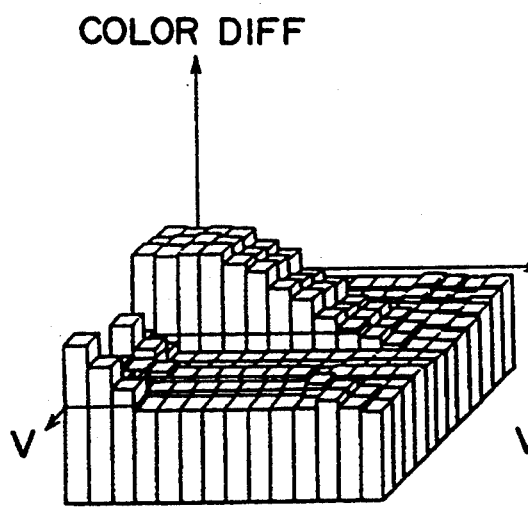
FIG. 12c and 12d are graphs of the corrected color difference value in the horizontal and vertical direction, respectively, according to the present invention.

FIG. 12c shows the results of the horizontal color difference correction process removing this color bleeding area. The area in the center is the area that could not be processed for color bleeding because the area of continuously varying color difference values is larger than the area of smooth luminance values.

Figure 12D:
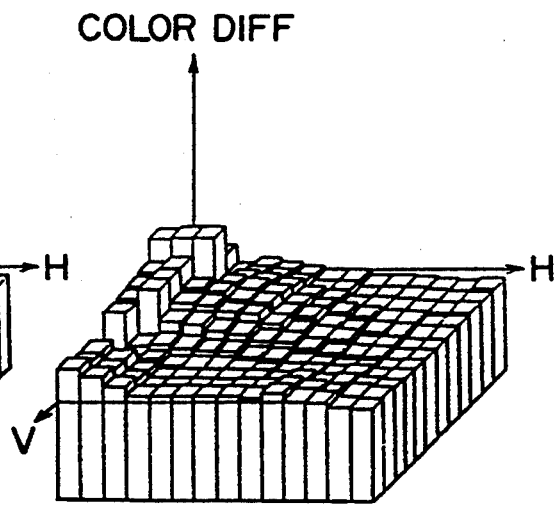

FIG. 12d shows the results of the vertical color difference correction process after horizontal color difference correction. Note that the area of color bleeding that remained after just horizontal color difference correction (FIG. 12c) is removed. This is because the luminance values in the vertical direction are evenly distributed through these pixels and the color difference signals are assumed to be the same, and color bleeding that could not be removed by averaging the color difference values is distributed through the surrounding pixels and smoothed. As a result, color bleeding is removed, vertical variation of the color difference values is improved, and image quality is improved.

The leading edge detector 2 and trailing edge detector 3 form a luminance change point detection means, the leading edge color difference corrector 4 and trailing edge color difference corrector 5 form a stable luminance area detection means, color difference value variation range detection means, and color difference value corrector, and the vertical color difference corrector 6 forms a pixel selection means and vertical color difference corrector. Note also that the luminance variation range is the range from pixels n1 to n2, the stable luminance ranges are the ranges from pixels n1 to n1−a and n2 to n2+b, and the color difference variation ranges are the ranges from pixels n1 to k1 and n2 to k2.

As described above, the edge of the pixel range of continuously varying luminance values in the horizontal direction is first detected by the leading edge detector 2 and the trailing edge detector 3. The color difference values varying along the edge of this detected luminance value range are then changed to values relative to the change in the luminance values by the leading edge color difference corrector 4 and trailing edge color difference corrector 5. The vertical color difference corrector 6 then extracts those pixels that are consecutive in the vertical direction of the image, and corrects the color difference values. Color difference signal rounding is thus corrected and color bleeding is greatly reduced by correcting the color difference signals in two stages, in the vertical and horizontal directions of the image, so that the change in the color difference values matches the change in the luminance values.

In most images, the video signal is output in the horizontal scanning direction, there is significant rounding of the color difference signal due to the limited band width of the video signal, and color bleeding is observed because the change in the color difference values cannot keep pace with the change in the luminance values. In other words, there is a correlation between the area in which color changes and the area in which the luminance values change, and where there is a significant change in the luminance values there is a correspondingly noticeable change in the color difference signal, which appears to the observer as pronounced color bleeding.

Therefore, the area (i.e., the edge) of significant change in the luminance value where color bleeding is most conspicuous is first detected in the horizontal direction, and color bleeding is removed from this area as much as possible. However, if correction is only applied in the horizontal direction, there will be vertically adjacent areas where the color bleeding was removed and was not removed. This results in an even more unnatural image and image quality may actually deteriorate. By also correcting the color difference values in the vertical direction using the luminance values, the color difference values of vertically adjacent areas are averaged (smoothed). Discontinuous variations in the color difference values can thus be prevented, color bleeding can be uniformly reduced, and image quality can be significantly improved throughout a more natural image.

Third Embodiment

The third embodiment of a video signal correction apparatus according to the present invention is described below with reference to FIG. 13.

Figure 13:
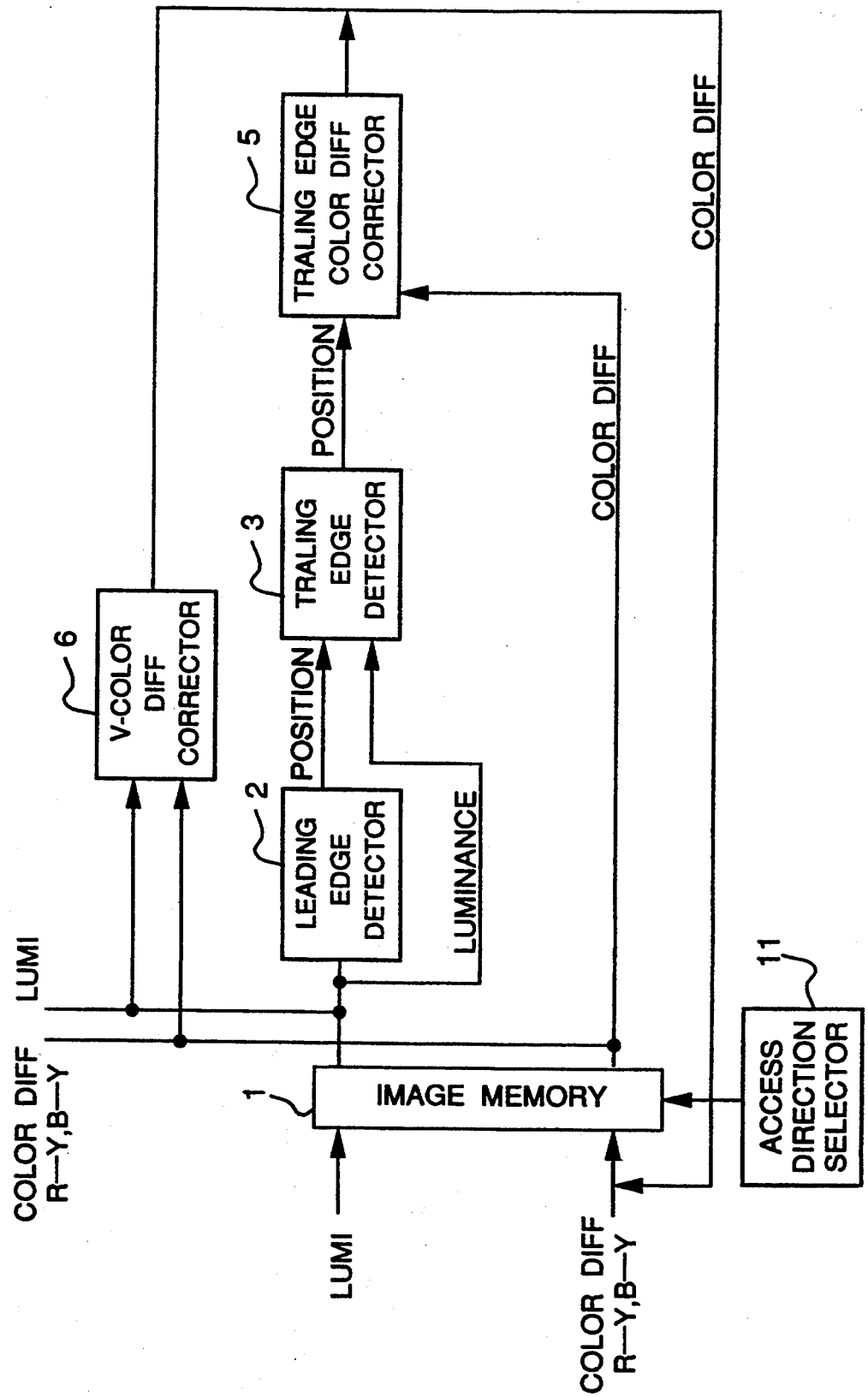
FIG. 13 is a block diagram of a video signal correction apparatus according to a third embodiment of the present invention.

Like parts in FIGS. 1 and 13 are identified by like reference numerals. This third embodiment differs from the first embodiment in the addition of an access direction selector 11. The access direction selector 11 reads and rewrites the luminance values and color difference values from the image memory 1, and selects either the forward horizontal direction or reverse horizontal direction for reading and rewriting the data with respect to the image memory 1.

In this embodiment, the image luminance values are read from the image memory 1 in one access direction, i.e., the forward horizontal direction or reverse horizontal direction, as determined by the access direction selector 11. The leading edge pixel n1 where a significant change in the luminance value begins is detected by the leading edge detector 2, and the trailing edge pixel n2 where this change in luminance values ends is detected by the trailing edge detector 3.

While reading the color difference values of the image from the image memory 1 in the same access direction, the trailing edge color difference corrector 5 then changes the color difference values for all data in the image if the color difference values change continuously immediately after the trailing edge.

The same operations are then repeated by the leading edge detector 2, trailing edge detector 3, and trailing edge color difference corrector 5 while reading the data from the image memory 1 in the access direction opposite to that previously set by the access direction selector 11 to correct the color difference values near the area of significant change in the luminance value.

The image luminance values are then read from the image memory 1 in the vertical direction of the image, and the color difference values of smooth luminance values are averaged and the results are output to the image memory 1 by the microcomputer 9. This averaging process is repeated plural times.

It is therefore possible by this embodiment to obtain an image of improved image quality, reduced color noise, and no color bleeding as described in the first embodiment above. Because the effects of this embodiment are obtained by simply changing the processing direction, the required hardware configuration is simpler and the cost is lower when compared with those of the first embodiment shown in FIG. 1.

A processed image of corrected color difference values is obtained in this embodiment by correcting the color difference values of all image pixels in either the forward or reverse horizontal direction, reversing the access direction, and then repeating the correction process. Note, however, that the same effect can be obtained by alternating the forward and reverse access directions and correction process on a line by line basis.

The configuration of an image data processing apparatus according to the present embodiment achieved in a microcomputer is the same as that shown in FIG. 2. In this embodiment, however, the video signal input to the microcomputer 9 is processed by the leading edge detector 2, trailing edge detector 3, trailing edge color difference corrector 5, access direction selector 11, vertical color difference corrector 6.

A detailed description of the operation of the leading edge detector 2, trailing edge detector 3, trailing edge color difference corrector 5, and vertical color difference corrector 6 is omitted below because the operation of these in this embodiment is identical to that of the first embodiment described above.

Figure 14:
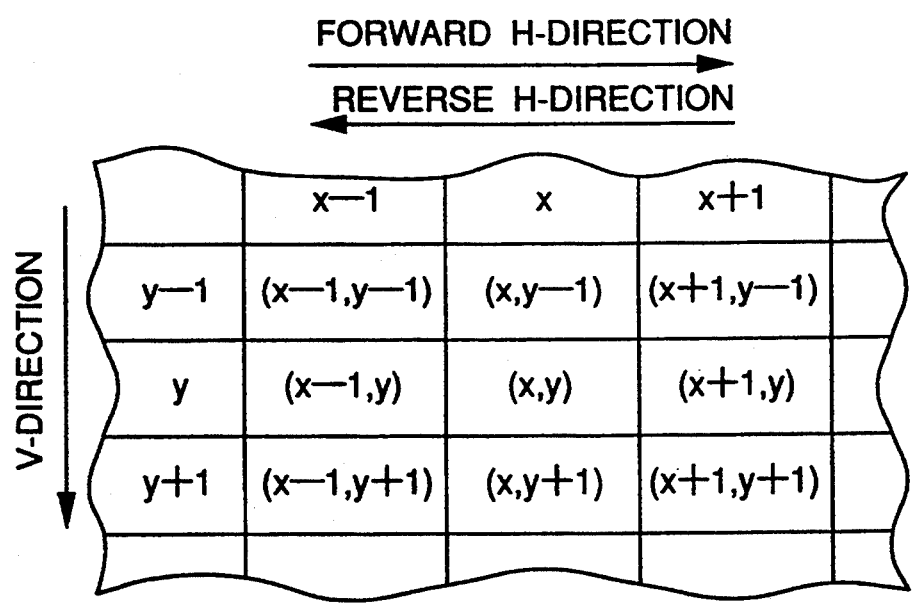
FIG. 14 is a graph used to describe the pixel position and direction in the image memory in the third embodiment.

FIG. 14 shows the relationship between the pixel position and the pixel value storage position in the image memory 8. This addressing matrix matches the horizontal (X) axis of the image memory 8 with the forward horizontal scanning direction of the image signal, defines the reverse access direction as the opposite of this forward horizontal direction, and matches the vertical (Y) axis of the image memory 8 with the sub-scanning direction. Each (x,y) value therefore identifies the position of one pixel in the image, and is the address of that pixel in the image memory 8.

Figure 15:
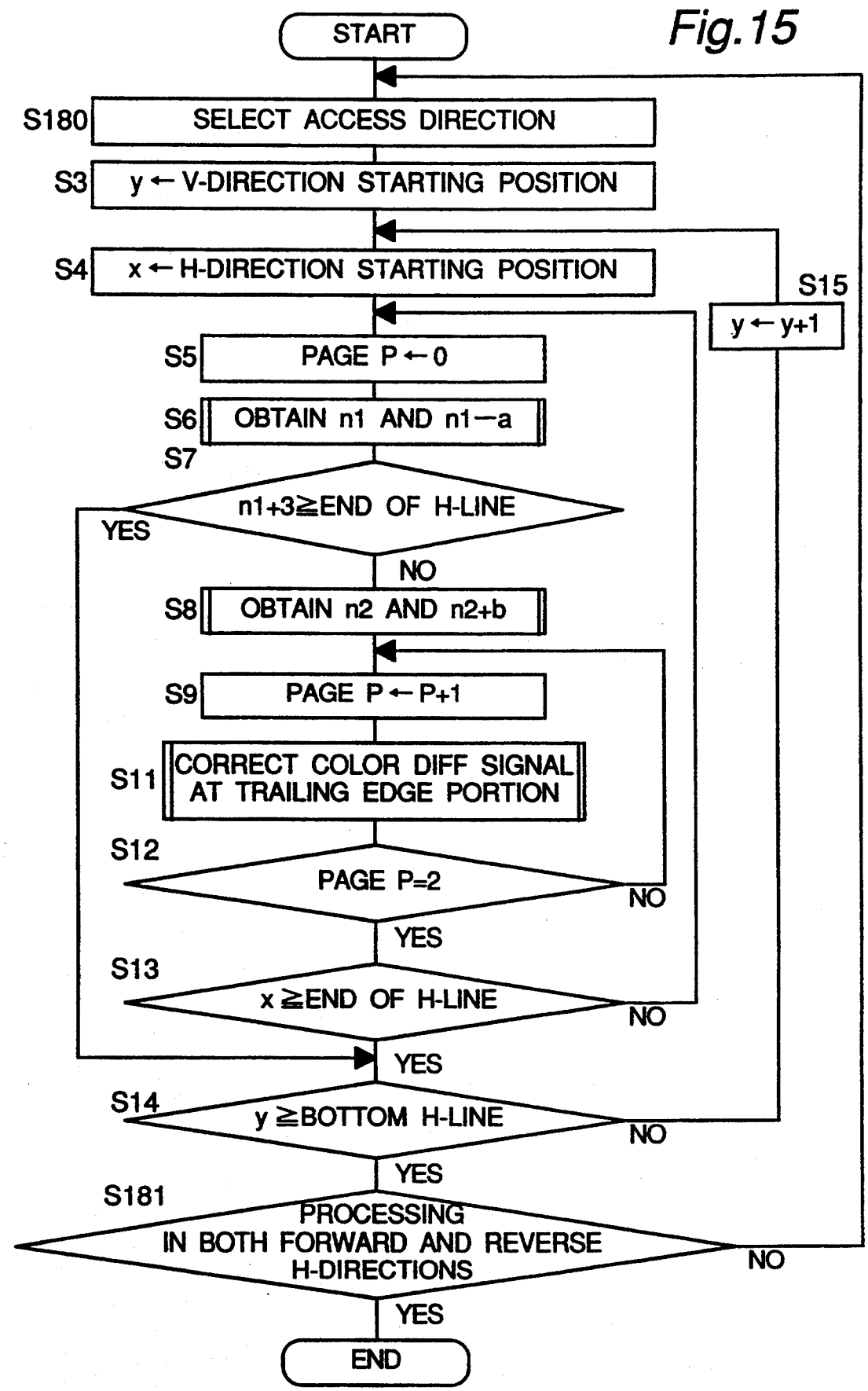
FIG. 15 is a flow chart used to describe the color difference value correction operation in the horizontal direction of an image in the third embodiment, FIG. 16 show graphs in which W5 is a graph of the color difference value after correction in the forward horizontal direction in the third embodiment, W6 is a graph of the color difference value after correction in the reverse horizontal direction in the third embodiment, W7 is a graph of the color difference value after correction in the forward horizontal direction in the fourth embodiment; and W8 is a graph of the color difference value after correction in the reverse horizontal direction in the fourth embodiment.

The overall horizontal color difference correction process executed by the video signal correction apparatus in FIG. 13 is shown in FIG. 15, each step of which is described below. Note that identical processes are identified by identical step numbers in FIGS. 5 and 15. In addition, the referenced horizontal direction is the access direction set by the access direction selector 11.

According to the flow chart shown in FIG. 15, when compared with the flow chart of FIG. 5, steps s180 and s181 are added, and step s10 is deleted.

This process starts (step s180) by the access direction selector 11 setting the access direction of the image memory 8.

In step s3, the position of the pixel at which processing in the vertical direction starts is set in the image memory 8.

In step s4, the position of the pixel at which processing in the horizontal direction starts is set in the image memory 8.

In step s5, the page number is set (to page 0 in this embodiment) for reading the luminance values from the image memory 8.

In step s6, the luminance values are sequentially read from the image memory 8, and the position of pixel n1 at the start of the current luminance value edge is obtained. This step corresponds to the process executed by the leading edge detector 2.

In step s7, it is determined whether the pixel which is three pixels ahead of the detected leading edge is ahead of the end point of the pixels in the horizontal direction. If this pixel exceeds the horizontal end point, the end point cannot be detected, and the color difference value is therefore not corrected.

In step s8, luminance values are again read from the image memory 8 to find the end of the luminance value edge as pixel n2. The luminance value of the pixel n2+b pixels ahead of the pixel trailing edge n2 (where b is greater than or equal to 2) is also evaluated to determine whether the continuous increase or decrease in luminance continues for at least two pixels beyond pixel n2. This range from n2 to n2+b is obtained as the area of minimal change in the luminance value. This step corresponds to the process executed by the trailing edge detector 3.

In step s9, the page number is changed in the image memory 8 to read the color difference values. The new page number is set to read either of the color difference values R-Y or B-Y. In step s9, the color difference value of the pixels in the area of minimal change in the luminance value obtained in step s8 is read from the same address in the image memory 8. Pixel k2 (the pixel at which the continuous increase or decrease in the color difference value ends) is detected, and the color difference values from the trailing edge point n2 to pixel k2 are corrected and written back to the image memory 8. This process is executed by the trailing edge color difference corrector 5.

In step s12, it is determined whether both of the color difference values R-Y and B-Y have been corrected.

In step s13, it is determined whether processing of one complete horizontal line in the image has been completed. If one H line has not been completely processed, the process loops back to step s5 to correct the color difference values for all pixels in one horizontal line.

By step s14 it is detected whether or not the processing of the bottom horizontal line in the image has been completed. It is therefore determined whether the video signal correction process has been completed for the entire image by evaluating the y coordinate. If the entire image has not been processed, the vertical address coordinate y is incremented by one (step s15), and the process loops back to step s4.

When step s14 returns TRUE and the image correction process has been executed for the entire image in one horizontal scanning direction, it is then determined in step s181 whether the image correction process has been executed in both the forward and reverse directions. If processing in both horizontal directions has not been completed, step s181 loops back to step s180, the pixel value access direction is reversed, and the same process from step s3 to step s14 is repeated.

Color bleeding can be significantly suppressed and a noticeable improvement in image quality can be obtained compared with the original image by this vertical color difference value process. However, because the edge changes more sharply than the smooth change in the color difference signal in this horizontal correction process, parts of the image contours where the color changes may be emphasized with a slightly unnatural image resulting.

Fourth Embodiment

In the fourth embodiment of the invention, the color difference value of the trailing edge n2 is therefore changed to an average between the n2−1 pixel color difference value and the typical color difference value C2 of the pixels in the range of minimal change in the color difference value during color difference correction. It is thus possible to reduce emphasis of some color edges in image edge areas and color difference edge areas, and a good recorded image in which any unnatural components are further reduced can be obtained.

Table 2 shows the numeric data obtained by the correction processes of the third and fourth embodiments above immediately after processing the luminance signals and color difference signals of the source image in the horizontal direction. Note that in the third and fourth embodiments, the pixel at the leading edge immediately following the currently detected trailing edge point is used as the n2+b pixel for the trailing edge detector 3 to detect the n1+b pixel at the end of the area of minimal change in the luminance value continuous from the trailing edge.

These results were obtained from tests conducted using the value Th1=5 in the leading edge detection means and the trailing edge detection means. In Table 2, each row in the table shows the pixel position, column A shows the number of the pixel position, column B the luminance value of the source image, column C the color difference value of the source image, column D the color difference value after processing in the forward direction, column E the color difference value after processing in the opposite horizontal direction after processing in the forward horizontal direction, column F the color difference value after processing in the forward direction by the fifth embodiment, and column G the color difference value after processing in the opposite horizontal direction after processing in the forward horizontal direction by the fifth embodiment. Note that while there are two color difference signals (R-Y and B-Y), only the values for color difference signal B-Y are shown because the same process is used for both color difference signals.

TABLE 2

| A Pixel position | B Bright- ness | C Color diff. | D Forward direction | E Reversed direction | F For- ward direc- tion | G Re- versed direc- tion |
|---|---|---|---|---|---|---|
| 1 | 160 | −9 | −9 | −9 | −9 | −9 |
| 2 | 166 | −8 | −8 | −8 | −8 | −8 |
| 3 | 173 | −10 | −10 | −10 | −10 | −10 |
| 4 | 176 | −9 | −9 | −9 | −9 | −9 |
| 5 | 176 | −9 | −9 | −9 | −9 | −9 |
| 6 | 176 | −11 | −11 | −9 | −11 | −9 |
| 7 | 175 | −13 | −13 | −9 | −13 | −9 |
| 8 | 175 | −14 | −14 | −9 | −14 | −9 |
| 9 | 175 | −15 | −15 | −9 | −15 | −9 |
| 10 | 175 | −16 | −16 | −9 | −16 | −9 |
| 11 | 174 | −17 | −17 | −9 | −17 | −9 |
| 12 | 173 | −18 | −18 | −9 | −18 | −15 |
| 13 | 163 | −21 | −21 | −21 | −21 | −21 |
| 14 | 144 | −25 | −25 | −25 | −25 | −25 |
| 15 | 131 | −27 | −27 | −27 | −27 | −27 |
| 16 | 116 | −32 | −43 | −43 | −35 | −35 |
| 17 | 117 | −36 | −43 | −43 | −43 | −43 |
| 18 | 119 | −39 | −43 | −43 | −43 | −43 |
| 19 | 120 | −42 | −43 | −43 | −43 | −43 |
| 20 | 119 | −43 | −43 | −43 | −43 | −43 |
| 21 | 117 | −44 | −44 | −44 | −44 | −44 |
| 22 | 117 | −42 | −42 | −42 | −42 | −42 |
| 23 | 116 | −43 | −43 | −43 | −43 | −43 |
| 24 | 109 | −43 | −43 | −43 | −43 | −43 |
| 25 | 103 | −42 | −42 | −42 | −42 | −42 |

Figure 16:
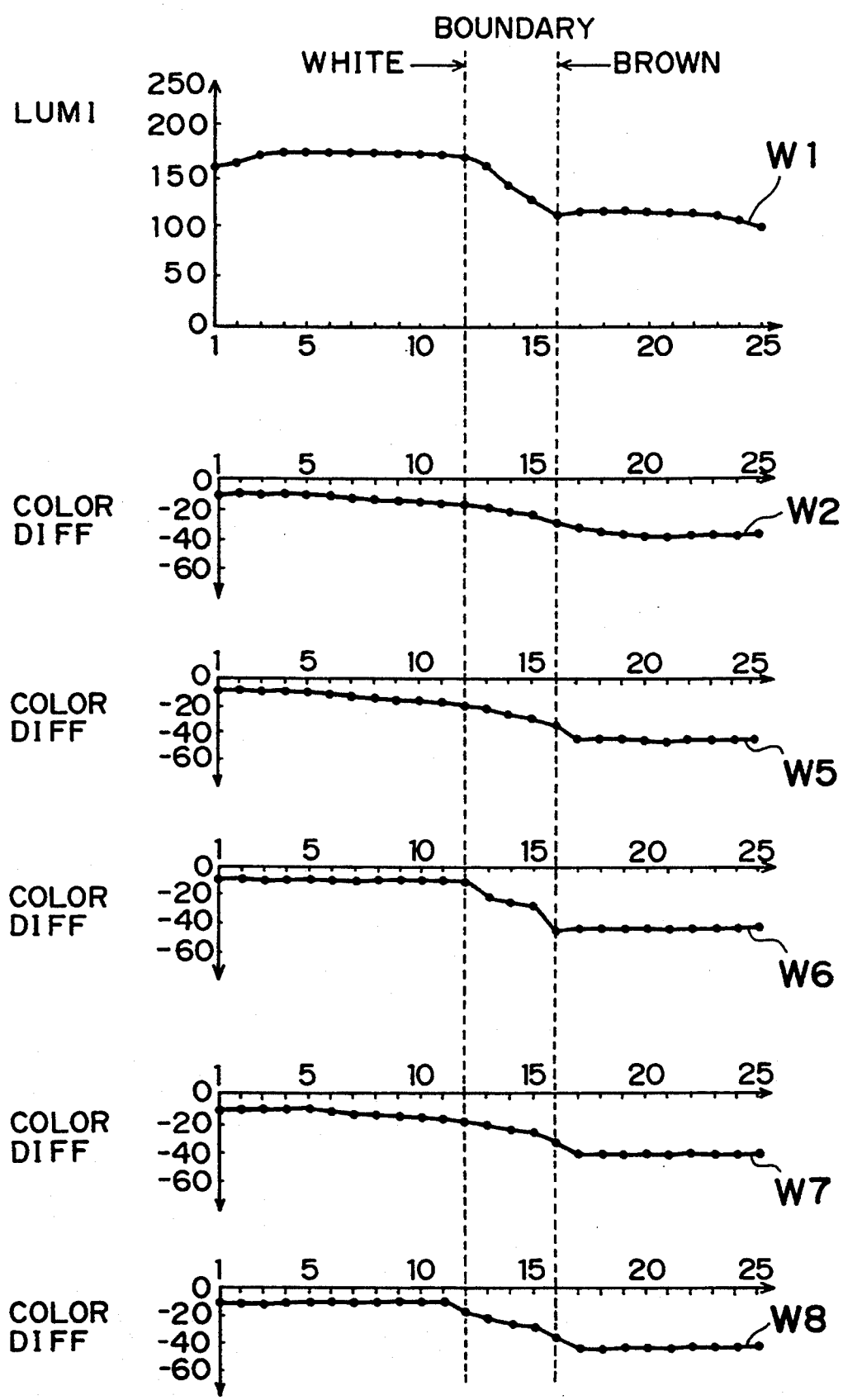

FIG. 16 shows waveforms W1, W2, W5–W8 of the process results shown in Table 2. In FIG. 16, the horizontal axis represents the pixel position, and the vertical axis represents the luminance value or color difference value of each pixel. Waveform W1 shows the luminance value of the source image, and waveform W2 shows the color difference values for the pixel position of a given luminance value in the source image without the correction of the present invention. Waveform W5 shows the results of the process executed by the third embodiment in the forward horizontal direction, and waveform W6 shows the results obtained by the third embodiment after reversing the access direction for the second loop through the flow chart shown in FIG. 15. Rounding of the color difference values is improved on only one side of the forward horizontal direction, resulting in the same improvement obtained by the first embodiment. In other words, by correcting the color difference values of pixels in which there is a continuous increase or decrease in the color difference value from the edge, color bleeding is eliminated and picture quality is significantly improved. However, there is a discontinuous change in the color difference values at the edges, and the color change is slightly emphasized in the edge area.

Waveforms W7 and W8 show the results obtained by the fourth embodiment, specifically, waveform W7 shows the result obtained by the color difference value correction in the forward H-direction processing, and waveform W8 shows the result obtained by the color difference value correction in the reverse H-direction processing. By interpolating the discontinuous color difference values near the edges using an average value, a discontinuous change in the color difference values is prevented. Color bleeding is eliminated by the fourth embodiment in a similar manner to that of the third embodiment shown in waveform W6, and a corrected image with natural image quality free of unnecessary emphasis of color changes is obtained.

As in the first embodiment, color bleeding can also be removed from areas which are incompletely processed in the horizontal direction only by also correcting the color difference values in the vertical direction.

Fifth Embodiment

The fifth embodiment of a video signal correction apparatus according to the present invention is described below with reference to FIG. 17. Like parts in FIGS. 13 and 17 are identified by like reference numerals.

Figure 17:
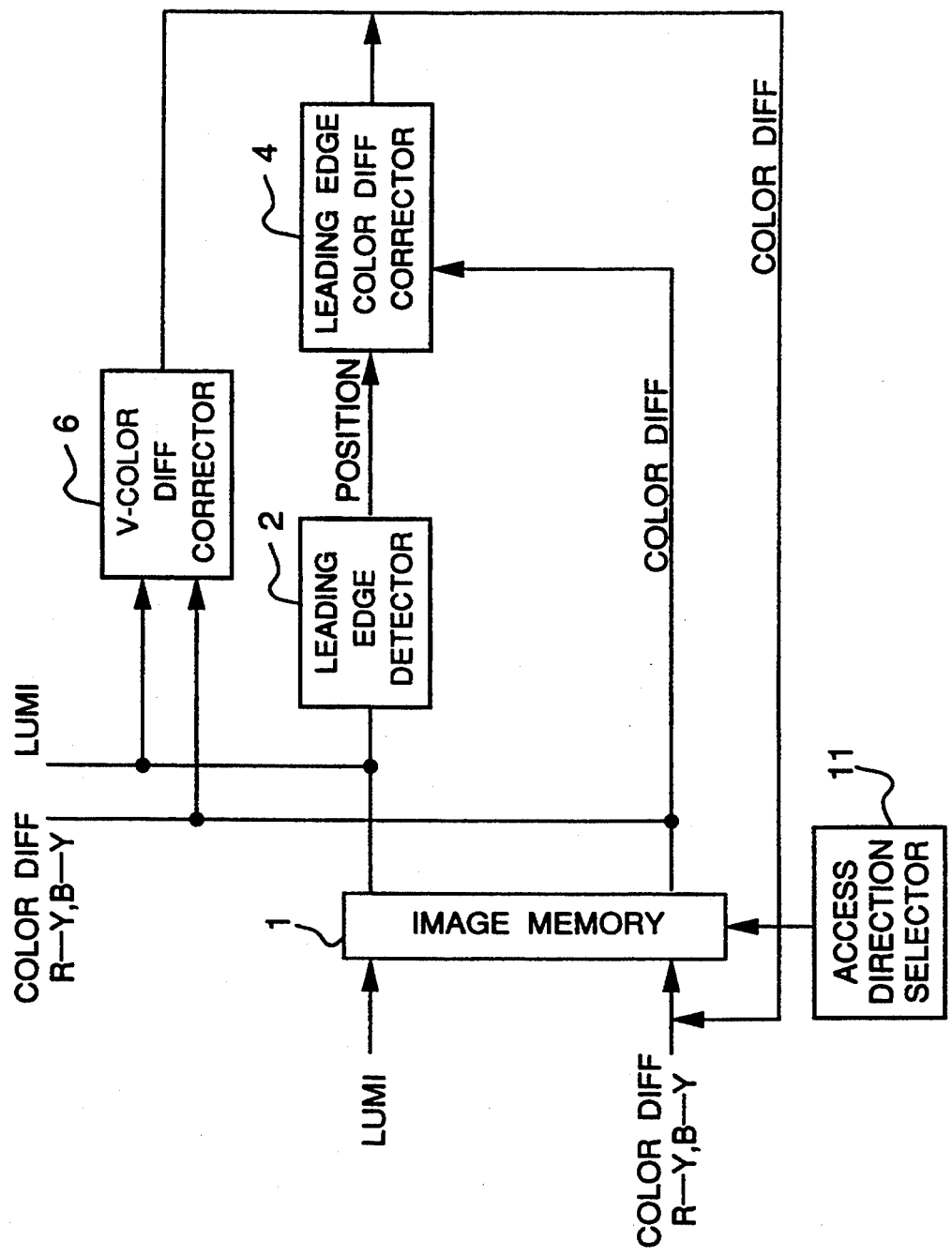
FIG. 17 is a block diagram of a video signal correction apparatus according to the fifth embodiment of the present invention.

Referring to FIG. 17, the image luminance values are read from the image memory 1 in one access direction, i.e., the forward horizontal direction or reverse horizontal direction, as determined by the access direction selector 11. The leading edge pixel n1 where a significant change in the luminance value begins is then detected by the leading edge detector 2.

If there is a continuous change in the color difference values immediately before the leading edge, the leading edge color difference corrector 4 then changes the color difference values while reading the color difference values of the image from the image memory 1 in the same access direction. This operation is repeated until the color difference values are corrected in the horizontal direction for all image data.

The access direction selector 11 then reverses the access direction and the same correction sequence is repeated to correct the color difference values in the area around any significant change in luminance value.

The image luminance values are then read from the image memory 1 in the vertical direction of the image, and the color difference values of smooth luminance values are averaged and the results are output to the image memory 1 by the vertical color difference corrector 6. This process is executed for all image data, resulting in a processed image with reduced color noise.

This embodiment features the most simplified construction of the video signal correction apparatuses described heretofore, and can be achieved at the lowest cost.

A processed image of corrected color difference values is obtained in this embodiment by correcting the color difference values of all image pixels in either the forward or reverse horizontal direction, reversing the access direction, and then repeating the correction process. Note, however, that the same effect can be obtained by alternating the forward and reverse access directions and correction process on a line by line basis.

The configuration of an image data processing apparatus according to the present embodiment achieved in a microcomputer is the same as that shown in FIG. 2. In this embodiment, however, the video signal input to the microcomputer 9 is processed by the leading edge detector 2, leading edge color difference corrector 4, access direction selector 11, and vertical color difference corrector 6.

The operation of this video signal processing apparatus is described below, omitting further description of the operation of the leading edge detector 2, leading edge color difference corrector 4, and vertical color difference corrector 6 the operation of these is identical to the operation executed by the same components in the first and second embodiments. Note also that the relationship between pixel position and image memory 8 addresses is also as shown in FIG. 14.

Figure 18:
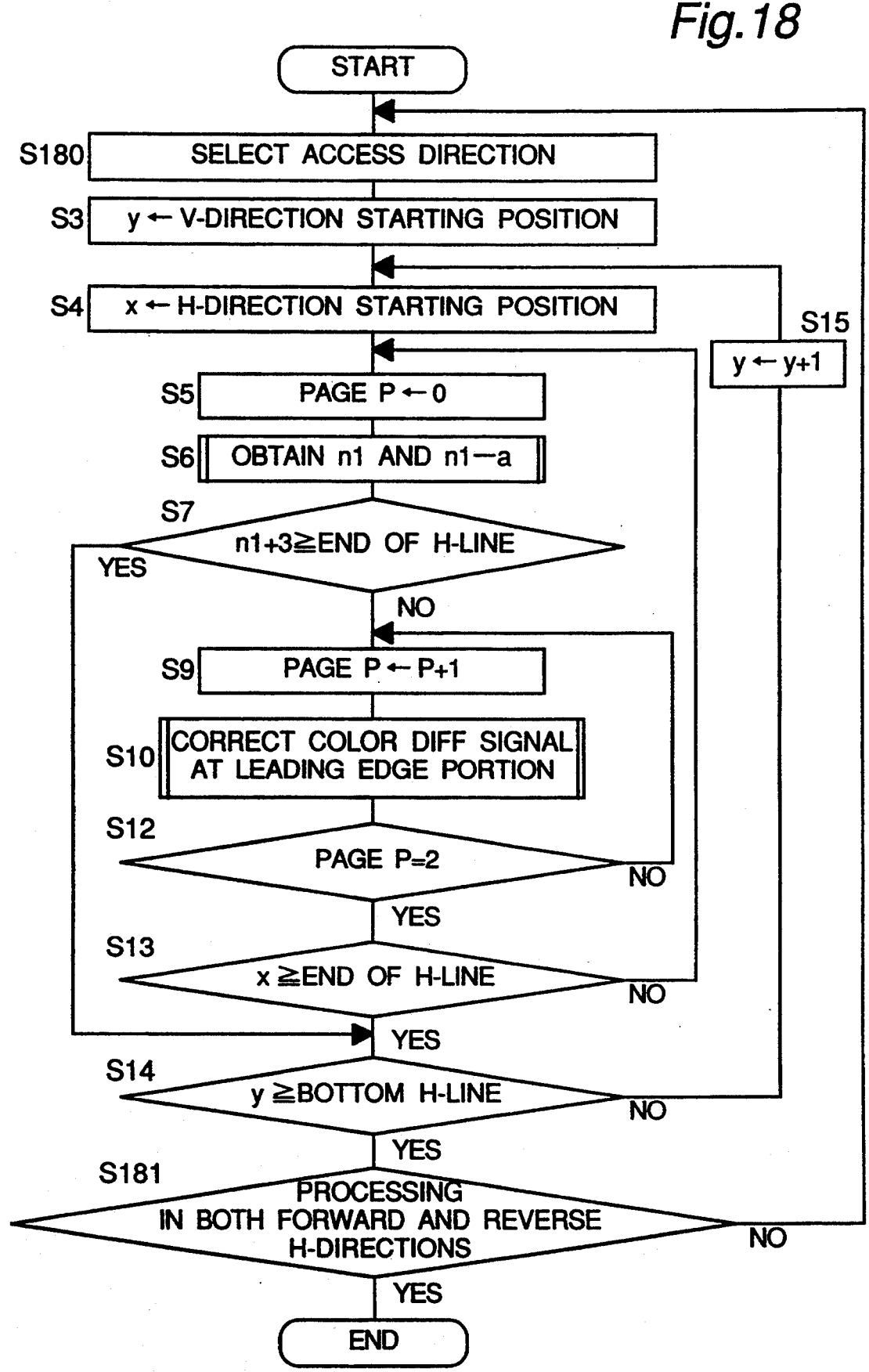
FIG. 18 is a flow chart used to describe the operation for correcting the color difference value in the horizontal direction of the image according to the fifth embodiment, FIG. 19 show graphs in which W9 is a graph of the color difference value after correction in the forward horizontal direction in the fifth embodiment, W10 is a graph of the color difference value after correction in the reverse horizontal direction in the fifth embodiment; W11 is a graph of the color difference value after correction in the forward horizontal direction in the sixth embodiment; and W12 is a graph of the color difference value after correction in the reverse horizontal direction in the sixth embodiment.

The overall horizontal color difference correction process executed by the video signal correction apparatus is shown in FIG. 18, each step of which is described below. Note that identical processes are identified by identical step numbers in FIGS. 15 and 18. In addition, the referenced horizontal direction is the access direction set by the access direction selector 11.

According to the flow chart shown in FIG. 18, when compared with the flow chart of FIG. 15, step s10 is added and steps s8 and s11 is deleted.

This process starts (step s180) by the access direction selector 11 setting the access direction of the image memory 8.

In step s3, the position of the pixel at which processing in the vertical direction starts is set in the image memory 8.

In step s4, the position of the pixel at which processing in the horizontal direction starts is set in the image memory 8.

In step s5, the page number is set (to page 0 in this embodiment) for reading the luminance values from the image memory 8.

In step s6, the luminance values are sequentially read from the image memory 8, and the position of pixel n1 at the start of the current luminance value edge is obtained. This step corresponds to the process executed by the leading edge detector 2.

In step s7, it is determined whether the pixel which is three pixels ahead of the detected leading edge is ahead of the end point of the pixels in the horizontal direction. If this pixel exceeds the horizontal end point, it is not possible to determine whether the change in luminance beginning from the leading edge is a continuously increasing or decreasing luminance edge, and the color difference value is therefore not corrected.

In step s9, the page number is changed in the image memory 8 to read the color difference values. The new page number is set to read either of the color difference values R-Y or B-Y.

In step s10, the color difference value of the pixels in the area of minimal change in the luminance value obtained in step s6 is read from the same address in the image memory 8. Pixel k1 (the pixel from which an increase or decrease in the color difference value continuous to the leading edge begins) is detected, and the color difference values from pixel k1 to the leading edge are corrected and written back to the image memory 8. This step corresponds to the process executed by the leading edge color difference corrector 4.

In step s12, it is determined whether to change the page in the image memory 8 to correct each of the color difference values R-Y, B-Y.

In step s13, it is determined whether processing of one complete horizontal line in the image has been completed. If one line has not been completely processed, the process loops back to step s5 to correct the color difference values for all pixels in one horizontal line.

By step s14 processing of one complete horizontal line in the image has been completed. It is therefore determined whether the video signal correction process has been completed for the entire image by evaluating the y coordinate. If the entire image has not been processed, the vertical address coordinate y is incremented by one (step s15), and the process loops back to step s4.

When step s14 returns TRUE and the image correction process has been executed for the entire image in one horizontal scanning direction, it is then determined in step s181 whether the image correction process has been executed in both the forward and reverse directions. If processing in both horizontal directions has not been completed, step s181 loops back to step s180, the pixel value access direction is reversed, and the same process from step s3 to step s14 is repeated.

Color bleeding can be significantly suppressed and a noticeable improvement in image quality can be obtained compared with the original image by this vertical color difference value process executed after the horizontal correction process.

In the leading edge color difference corrector 4 of this embodiment, the color difference values from the leading edge detected by the leading edge detector 2 to the n1−a pixel in the area of little change in the luminance value are sequentially read, pixel k1 at the end of the continuous increase or decrease in the color difference values is detected, and the median color difference value from pixel k1 to pixel n1−a is output to the image memory 8 as the color difference value from pixel k1 to the leading edge.

Sixth Embodiment

In the sixth embodiment, as in the fifth embodiment described above, by changing the color difference value of the leading edge pixel n1 to the average of the n1+1 pixel value and the typical value C1 of the color difference values in the area of minimal color difference change, partial color edge emphasis can be reduced at the edge areas and at the color difference value edge areas, and a good recorded image in which any unnatural components are further reduced can be obtained.

Color bleeding can also be removed from areas which are incompletely processed in the horizontal direction only by also correcting the color difference values in the vertical direction, and a good recorded image can obtained.

Table 3 shows the numeric data obtained by the correction processes of the fifth and sixth embodiments above immediately after processing the luminance signals and color difference signals of the source image in the horizontal direction. These results were obtained from tests conducted using the value Th1=5 in the leading edge detector 2. In Table 3, each row in the table shows the pixel position, column A shows the number of the pixel position, column B the luminance value of the source image, column C the color difference value of the source image. Column D shows the color difference value after processing in the forward direction, and column E shows the color difference value after processing in the opposite horizontal direction after processing in the forward horizontal direction by the fifth embodiment. Column F shows the color difference value after processing in the forward direction by the fifth embodiment, and column G the color difference value after processing in the opposite horizontal direction after processing in the forward horizontal direction by the sixth embodiment. Note that while there are two color difference signals (R-Y and B-Y), only the values for color difference signal B-Y are shown because the same process is used for both color difference signals.

TABLE 3

| A Pixel position | B Bright-ness | C Color diff. | D Forward direction | E Reversed direction | F Forward direction | G Reversed direction |
|---|---|---|---|---|---|---|
| 1 | 167 | −9 | −9 | −9 | −9 | −9 |
| 2 | 164 | −8 | −8 | −8 | −8 | −8 |
| 3 | 172 | −10 | −10 | −10 | −10 | −10 |
| 4 | 176 | −9 | −9 | −9 | −9 | −9 |
| 5 | 176 | −9 | −9 | −9 | −9 | −9 |
| 6 | 176 | −11 | −9 | −9 | −9 | −9 |
| 7 | 175 | −13 | −9 | −9 | −9 | −9 |
| 8 | 175 | −14 | −9 | −9 | −9 | −9 |
| 9 | 175 | −15 | −9 | −9 | −9 | −9 |
| 10 | 175 | −16 | −9 | −9 | −9 | −9 |
| 11 | 174 | −17 | −9 | −9 | −9 | −9 |
| 12 | 173 | −18 | −9 | −9 | −15 | −15 |
| 13 | 163 | −21 | −21 | −21 | −21 | −21 |
| 14 | 144 | −25 | −25 | −25 | −25 | −25 |
| 15 | 131 | −27 | −27 | −27 | −27 | −27 |
| 16 | 116 | −32 | −32 | −43 | −32 | −35 |
| 17 | 117 | −36 | −36 | −43 | −36 | −43 |
| 18 | 119 | −39 | −39 | −43 | −39 | −43 |
| 19 | 120 | −42 | −42 | −43 | −42 | −43 |
| 20 | 119 | −43 | −43 | −43 | −43 | −43 |
| 21 | 117 | −44 | −44 | −44 | −44 | −44 |
| 22 | 117 | −42 | −42 | −42 | −42 | −42 |
| 23 | 116 | −43 | −43 | −43 | −43 | −43 |
| 24 | 110 | −43 | −43 | −43 | −43 | −43 |
| 25 | 109 | −42 | −42 | −42 | −42 | −42 |

Figure 19:
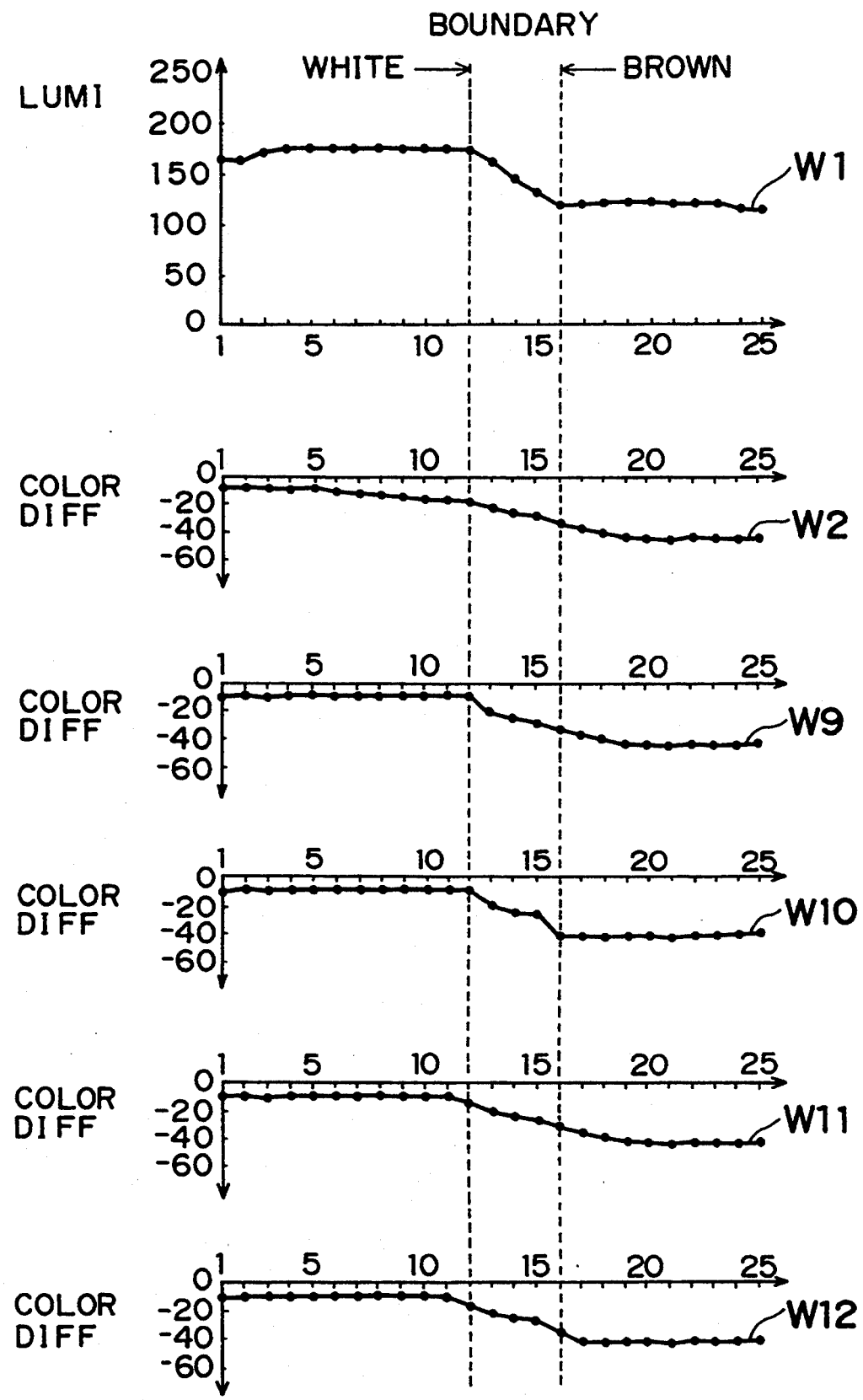

FIG. 19 show waveforms W1, W2, W9-W12 showing the process results shown in Table 3. The horizontal axis shows the pixel position, and the vertical axis shows the luminance value or color difference value of each pixel. Waveform W1 shows the luminance value of the source image, and waveform W2 shows the color difference values for the pixel position of a given luminance value in the source image without any correction by the present invention. Waveforms W9 and W10 show the results of the process executed by the fifth embodiment, specifically, waveform W9 is obtained by the processing in the forward H-direction, and waveform W10 is obtained by the processing in the reverse H-direction after reversing the access direction for the second loop through the flow chart shown in FIG. 18. Rounding of the color difference values is improved on only one side of the forward horizontal direction in waveform W9, but color difference value rounding is improved by reversing the horizontal direction as shown by the waveform W10, resulting in the same improvement obtained by the first embodiment. In other words, by correcting the color difference values of pixels in which there is a continuous increase or decrease in the color difference value from the edge, color bleeding is eliminated and picture quality is significantly improved.

Waveforms W11 and W12 show the results obtained by the sixth embodiment, specifically, waveform W11 shows the result obtained by the color difference value correction in the forward H-direction processing, and waveform W12 shows the result obtained by the color difference value correction in the reverse H-direction processing. As in the fourth embodiment, a corrected image with natural image quality free of unnecessary emphasis of color changes is obtained.

Seventh Embodiment

The seventh embodiment of a video signal correction apparatus according to the invention is constructed as shown in FIG. 1.

In this embodiment, however, the vertical color difference corrector 6 reads the luminance values and color difference values for at least three vertically consecutive pixels from the image memory 1, which stores the color difference values corrected for the horizontal direction. One of the read pixels is then defined as the target pixel, and those pixels for which the absolute value of the difference in luminance values is less than Y% (where $5 \leq Y \leq 30$) of the luminance value Yh of the target pixel are selected from among the remaining pixels read from the image memory 1. The color difference value of the target pixel is then changed using the color difference value of the selected pixels.

The operation of the above embodiment is described below, omitting further description of the horizontal processing operation, which is identical to that in the first embodiment above.

Three luminance values, i.e., the luminance value of the one target pixel and the pixels immediately above and below, are read from the image memory 1, to which the pixel values have been rewritten after completion of the horizontal process as described above. The vertical color difference corrector 6 then compares the luminance value of the two vertically adjacent pixels with the luminance value Yh of the target pixel, selects the pixel(s) for which the absolute value of the luminance difference is Y% (where $5 \leq Y \leq 30$) of luminance value Yh, and corrects the color difference of the target pixel using the color difference value of the selected pixel(s). After thus correcting the color difference of vertically adjacent pixels, the new color difference values are written back to the image memory 1.

By applying this operation to all data within one image, a processed image in which color bleeding and color noise are reduced can be obtained.

Figure 20:
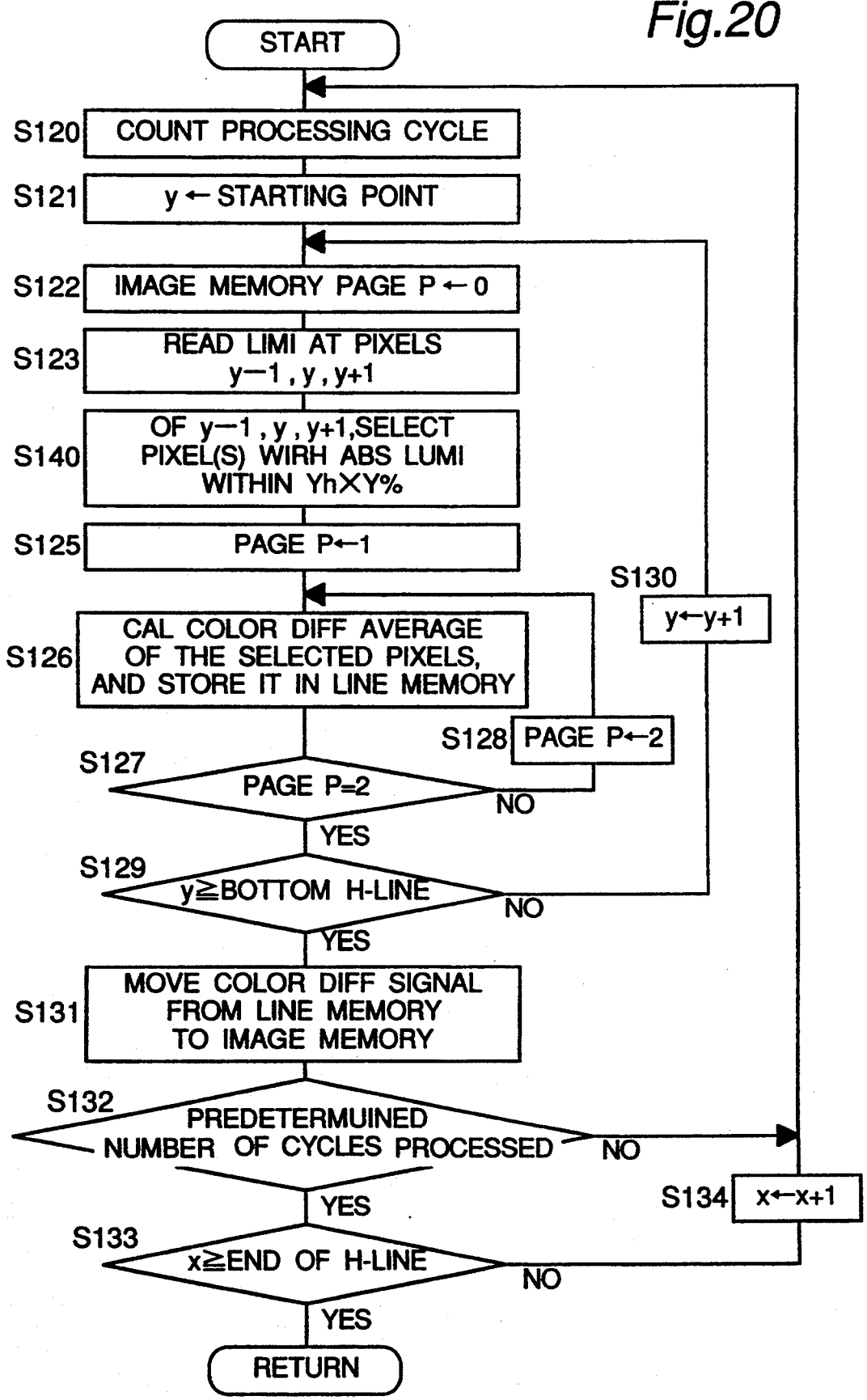
FIG. 20 is a flow chart used to describe the operation for correcting the color difference value in the vertical direction of the image according to the present embodiment.

FIG. 20 is the flow chart of the process correcting the color difference values in the vertical direction of the image in the seventh embodiment of the invention. The flow chart of FIG. 20 differs from that of FIG. 10 in that step s124 is replaced by step s140. This process is described in detail below.

It is to be noted that this operation processes three vertical pixels at a time, and is repeated plural times to cover all vertically aligned pixels. In addition, steps identified with the same numbers as in FIG. 10 represent the same process.

The first step s120 is to count the number of cycles this loop is executed in the vertical direction.

The y coordinate from which this process starts is then set in step s121.

In step s122, the page number is set to page 0 for reading the luminance values from the image memory 8, and in step s123 the luminance values for the three vertically aligned pixels y−1, y, and y+1 are fetched from the image memory 8.

In step s140, it is determined whether the absolute value of deviations of the luminance values of pixels y−1 and y+1 are within Y% of Yh where Yh is the luminance value of the target pixel y. The pixel(s) within this range are selected.

In step s125, the image memory 8a (page) is changed to image memory 8b storing the color difference values R-Y, and the image line memory 10a (see FIG. 2) is selected to temporarily store the color difference values. In step s126, the average of the color difference value of pixel y and the color difference value(s) of the pixel(s) selected in step s124 is output to the image line memory 10a at a position corresponding to the color difference value of pixel y, as diagrammatically shown in FIG. 11b. If no pixel was selected in step s124, the color difference value of pixel y is not changed. In this case, the existing color difference value for pixel y remains held in the image line memory 10a.

In step s127, the memory page is checked. If step s126 has only been executed for one of the two color difference values (R-Y, B-Y) the page is reset to page 2, so that the data from image memory 8c and line memory 10b are activated and the procedure loops back through step s126.

If step s126 has been executed for both of the two color difference values, it is determined in step s129 whether the color difference correction process has been completed for all pixels in the vertical direction.

If the process has not been completed, the process pixel coordinate y is incremented one (step s130), and the process loops back to step s122.

If the process has been completed for all pixels in the vertical direction (determined in step s129), the corrected color difference values stored in the image line memories 10a and 10b are written back to the corresponding pixel position addresses in the image memories 8b and 8c (step s131), respectively.

In step s132 it is determined whether this correction loop has been executed the predetermined number of times. If it has, it is determined whether the process has been executed for the entire image. If not, the horizontal pixel position is incremented one, and the loop returns to step s120. By thus repeating this loop until the entire image is processed, color noise in the image can be reduced.

It is difficult to discern changes in color because of the normal range of human visual perception when the luminance value of the target pixel is low. In high luminance value areas, it is therefore necessary to use a wide difference range in determining the value of Y (%) used by the vertical color difference corrector 6 in order to select the correct pixels.

The absolute value of the difference in the luminance values of the target pixel (luminance value Yh) and the adjacent pixels is therefore Y% of Yh where $5 \leq Y \leq 30$ (%).

This is because the correction process has minimal effect when Y% is less than 5% because the pixels vertically bracketing the target pixel are rarely selected due to noise. When the luminance value difference is large, the change in the color difference values is also great. If Y% is greater than 30%, color bleeding may be caused in the vertical direction.

The value of Y% in this embodiment is therefore set to 10%, three vertically adjacent pixels (the target pixel and the one pixel each above and below) are processed at one time, and the average of the selected pixel and target pixel color difference values is output as the new (corrected) color difference value of the target pixel.

The vertical color difference corrector 6 references three vertically consecutive pixels (including the target pixel) for color difference correction, but any other odd number of pixels, e.g., five or seven, can be alternatively referenced. In this case, however, only those pixels of which the luminance value is within Y% of the luminance value of the target pixel and are positioned continuously to the target pixel are selected.

The vertical color difference corrector 6 in this embodiment executes the same process plural times for pixels consecutive in the vertical direction, but can also execute this process only once.

The number of times the vertical process loop is executed is from 3 to 10. This is because the object of repeating this loop is to increase the overall number of pixels referenced, and to reduce color noise. However, if the loop is executed only one or two times, the number of referenced pixels is small and it is difficult to reduce color noise; if the loop is executed more than ten times, the number of referenced pixels becomes too large, and the overall color becomes light. The number of loops in this embodiment is therefore set to 4.

Slight color noise produced by the color bleeding process can be reduced and a processed image with good image quality can be obtained by the vertical color difference corrector 6 applying this color difference correction process to all of the image data.

In addition, the processed color difference values are stored in the image line memories 10a and 10b and all processed pixel values in the vertical direction are batch written to the image memories 8b and 8c, respectively, after one complete line is processed in this embodiment. It is also possible, however, to use a temporary buffer to transfer the data to the image memory 8b or 8c after processing the target pixel position is completed. The image line memories 10a and 10b are used in this embodiment to simplify the description of this process.

FIGS. 21a–21d are graphs of the experimental results of color difference correction by the present embodiment. The y-axis shows the luminance value or the color difference value of each pixel, the x-axis shows the horizontal pixel position, and the z-axis shows the vertical pixel position.

Figure 21A:
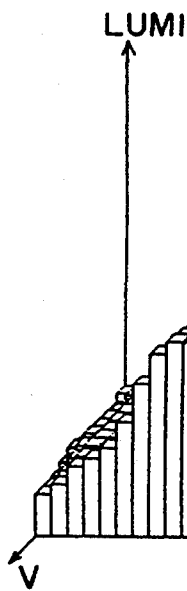
FIG. 21a is a graph of the luminance value of the source image.

FIG. 21a shows the luminance values of the source image. The trailing edge point of any given luminance value is where the luminance values are uniform (or within a specifically limited value range).

Figure 21B:
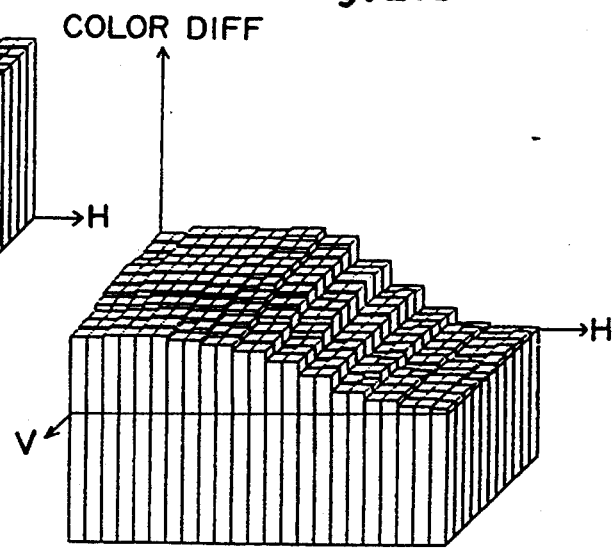
FIG. 21b is a graph of the color difference value from the same area as those shown in FIG. 21a and before the correction by the present invention.

FIG. 21b shows the color difference values for the pixel position corresponding to FIG. 21a. Note that the color difference values vary smoothly across the range of uniform luminance values in FIG. 21a. This range of smoothly changing values is where color bleeding is found.

Figure 21C:
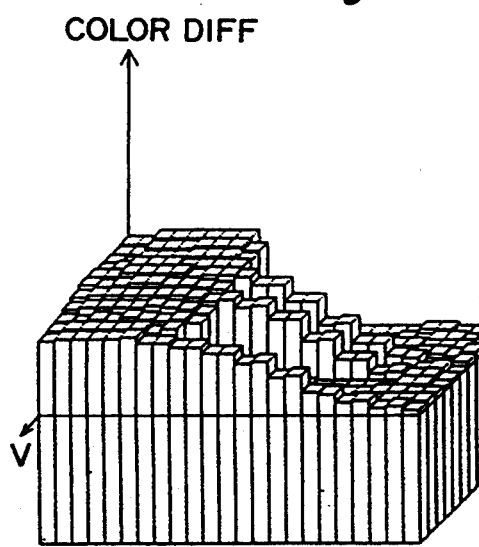
FIG. 21c and 21d are graphs of the corrected color difference value after processing in the horizontal and vertical directions, respectively, according to the present invention.

FIG. 21c shows the results of the horizontal color difference correction process removing this color bleeding area. The area in the center is the area that could not be processed for color bleeding because the area of continuously varying color difference values is larger than the area of smooth luminance values.

Figure 21D:
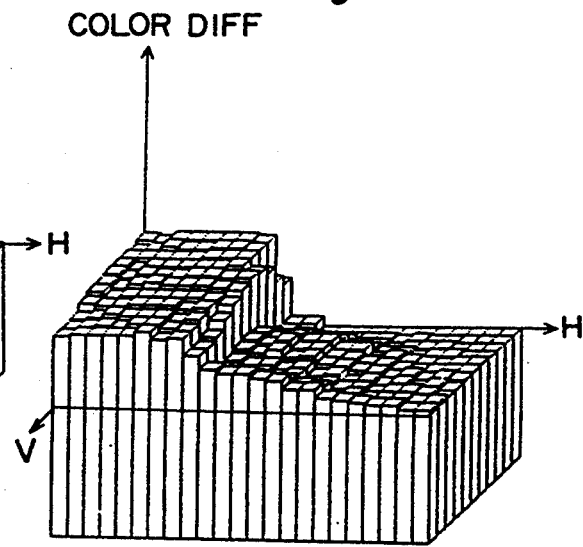

FIG. 21d shows the results of the vertical color difference correction process applied to the image after horizontal color difference correction (FIG. 21c). Note that the area of color bleeding that remained after just horizontal color difference correction (FIG. 21c) is removed. This is because the luminance values in the vertical direction are evenly distributed through these pixels and the color difference signals are assumed to be the same, and color bleeding that could not be removed by averaging the color difference values is distributed through the surrounding pixels and smoothed. As a result, color bleeding is removed, vertical variation of the color difference values is improved, and image quality is improved.

Eighth Embodiment

The eighth embodiment of a video signal correction apparatus according to the present invention is described below with reference to the accompanying figures.

Figure 22:
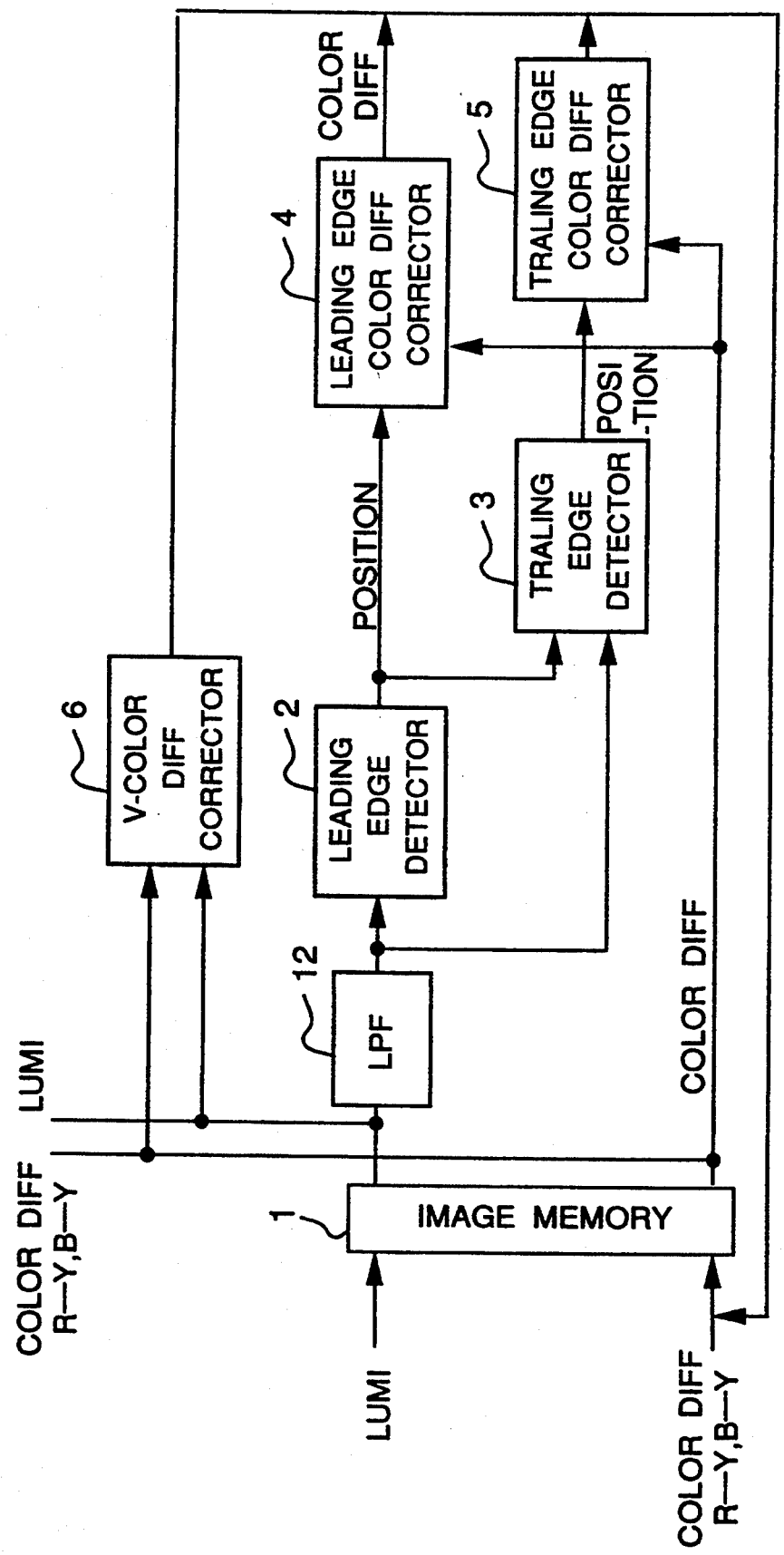
FIG. 22 is a block diagram of a video signal correction apparatus according to the eighth embodiment of the present invention.

FIG. 22 is a block diagram of the video signal correction apparatus according to the eighth embodiment of the invention. Like parts in FIGS. 1 and 22 are identified by like reference numerals. This eighth embodiment differs from the first in the addition of a low-pass filter 12 for low-pass filtering the luminance values read from the image memory 1.

The video signal processing operation of this embodiment is described below.

The image luminance values are read in the horizontal direction from the image memory 1, and are filtered by the low-pass filter 12 to remove noise and obtain luminance values with a reduced noise component. The leading edge detector 2 detects the leading edge, defined as pixel n1 at which a big change in the luminance value starts, and the trailing edge detector 3 detects the trailing edge, defined as pixel n2 at which the change in the luminance value ends.

If the color difference value before the leading edge or after the trailing edge also varies continuously, the leading edge color difference corrector 4 and the trailing edge color difference corrector 5 read the color difference values of the pixels in the horizontal direction from the image memory 1, and change the color difference values of the pixels in each area.

The vertical color difference corrector 6 then corrects the color difference values, which have already been corrected for reduced color bleeding in the horizontal direction, in the vertical direction to obtain a processed image in which the color bleeding is further reduced.

In other words, while color bleeding can be reduced as described in the first embodiment above, edge detection and detection of smooth luminance value regions are made easier by adding a low-pass filter 12 to reduce the noise component of the luminance values before color difference correction.

Note that while the low-pass filter 12 is used as a media filter in the above embodiment, the same effect can be obtained using a common smoothing filter, including an averaging filter that uses the average of plural pixels.

Because the low-pass filter 12 must reference the unprocessed color difference values from the image memory 1 to process the pixels, the low-pass filter 12 also comprises a function for temporarily storing the processed pixel luminance values so that the processed values are not written back to the image memory 1. This can be achieved by providing a line memory with capacity to temporarily store processing results in the horizontal direction, or plural buffers with sufficient capacity to store processing results in the horizontal direction for as long as the corresponding pixel position is within the processing range.

Figure 23:
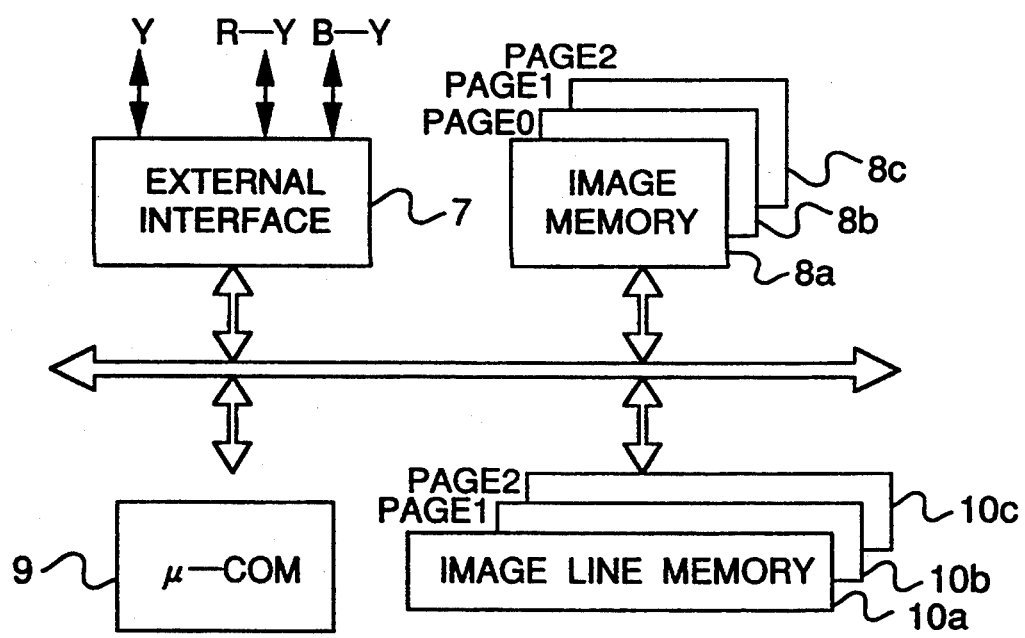
FIG. 23 is a block diagram of a video signal correction apparatus according to the eighth embodiment when achieved in a microcomputer.

The configuration of an image data processing apparatus according to the present embodiment achieved in a microcomputer is as shown in FIG. 23, wherein like components in FIGS. 2 and 23 are identified with like reference numerals. In this embodiment, however, an image line memory 10c used as auxiliary memory for temporarily storing one horizontal line of the values output by the low-pass filter 12 is added.

Other than accessing the luminance values from the image line memory 10c, operation of the leading edge detector 2, trailing edge detector 3, leading edge color difference corrector 4, trailing edge color difference corrector 5, and vertical color difference corrector 6 in the video signal processing apparatus described above is as described in the first embodiment.

Table 4 shows the numeric data obtained as the result of processing the luminance signal and color difference signal of the source image to correct the color difference values in the horizontal direction of the luminance signal after filtering the luminance signal through the low-pass filter. These results were obtained from tests conducted using the values Th1=$\alpha$=$\beta$=5. Each row in the table shows the pixel position, column A shows the number of the pixel position, column B the luminance value of the source image, column C the color difference value of the source image, column D the color difference value corrected using the luminance value of the source image according to the first embodiment, column E the luminance value after low-pass filtering the luminance value of the source image according to the eight embodiment, and column F the color difference value of the image processed according to the first embodiment using the luminance value after low-pass filter processing. Note that while there are two color difference signals (R-Y and B-Y), only the values for color difference signal R-Y are shown because the same process is used for both color difference signals.

TABLE 4

| A Pixel position | B Brightness | C Color diff. | D 1st embod. | E 8th embod. | F Color diff. |
|---|---|---|---|---|---|
| 1 | 112 | −26 | −26 | 112 | −26 |
| 2 | 113 | −24 | −24 | 113 | −24 |
| 3 | 118 | −22 | −22 | 118 | −22 |
| 4 | 136 | −20 | −20 | 136 | −20 |
| 5 | 146 | −15 | −15 | 146 | 0 |
| 6 | 146 | −12 | −12 | 146 | 0 |
| 7 | 149 | −10 | −10 | 148 | 0 |
| 8 | 148 | −8 | −8 | 148 | 0 |
| 9 | 140 | −5 | −5 | 147 | 0 |
| 10 | 147 | −2 | −2 | 147 | 0 |
| 11 | 148 | 0 | 0 | 148 | 0 |
| 12 | 150 | 0 | 0 | 148 | 0 |
| 13 | 147 | 0 | 0 | 147 | 0 |
| 14 | 145 | 0 | 0 | 145 | 0 |
| 15 | 144 | 0 | 0 | 144 | 0 |
| 16 | 140 | 0 | 0 | 140 | 0 |
| 17 | 134 | 0 | 0 | 134 | 0 |

Figure 24A:
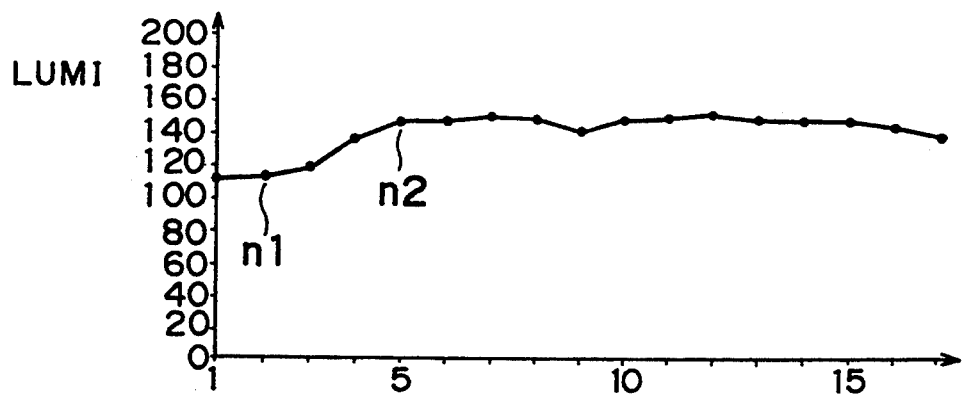
FIG. 24a is a graph of the luminance value in the source image.
Figure 24B:
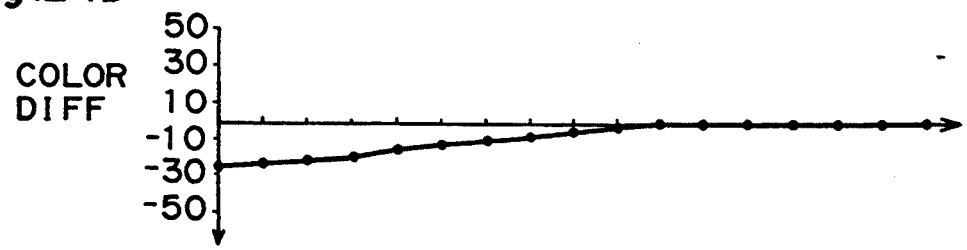
FIG. 24b is a graph of the color difference value before the correction by the present embodiment.
Figure 24C:
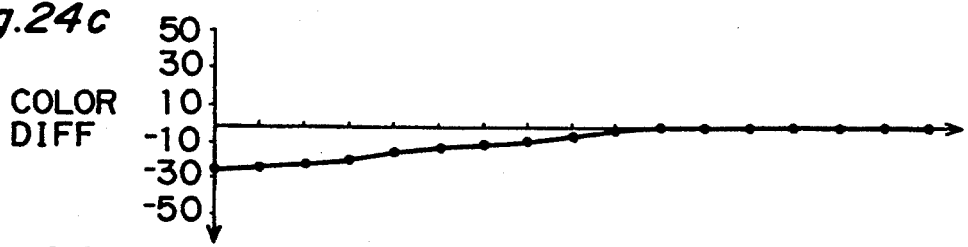
FIG. 24c is a graph of the color difference value after correction in the horizontal direction by means of the first embodiment.
Figure 24D:
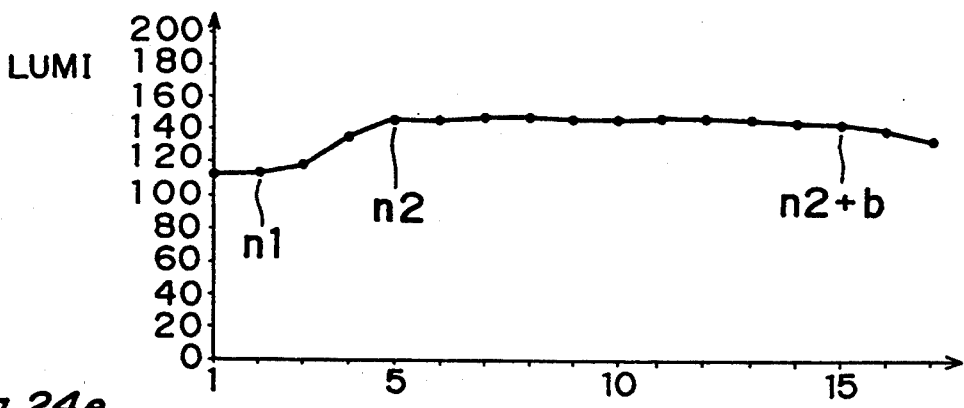
FIG. 24d is a graph of the luminance value after filtering the luminance value of the source image using a low-pass filter in the eighth embodiment of the invention.
Figure 24E:
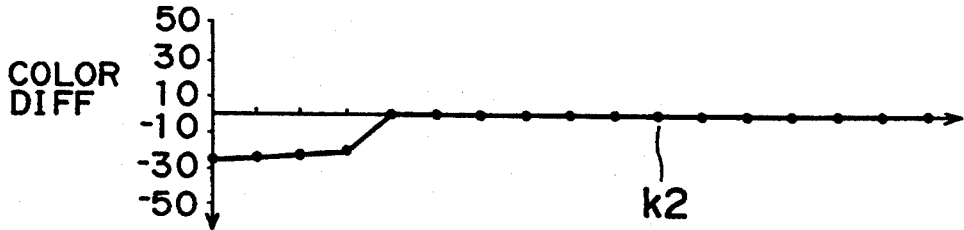
FIG. 24e is a graph of the color difference value after correction in the horizontal direction based on the luminance value after the low-pass filtering in the eighth embodiment of the invention.

FIGS. 24a-24d are graphs of the process results shown in Table 4. The horizontal axis shows the pixel position, and the vertical axis shows the luminance value or color difference value of each pixel. FIG. 24a shows the luminance value of the source image, FIG. 24b shows the color difference values in the source image, FIG. 24c shows the color difference values obtained by the first embodiment based on the luminance values of the source image, and FIG. 24d shows the luminance values obtained after low-pass filter processing the luminance values of the source image. In each of these figures, n1 is the leading edge of the luminance value, n2 is the trailing edge, and n2+b is the end point of the uniform luminance area. FIG. 24e shows the corrected color difference values obtained by the eighth embodiment where k2 is the end of the color bleeding area for the color difference value. These results were obtained using the same process executed by the first embodiment based on the results shown in FIG. 24d.

When the luminance values of the source image shown in Table 4 are used, the leading edge is detected at the second pixel and the trailing edge is detected at the fifth pixel. Because the luminance value of the trailing edge is 146, the condition for the uniform luminance value area is a range of consecutive pixels with a luminance value is greater than or equal to 141 and less than or equal to 151 (146±Th1).

The range of smooth values satisfying the conditions from trailing edge n2 is through the eighth pixel because the luminance value of the ninth pixel is 140.

As shown in FIG. 24a, however, only one pixel (pixel 9) does not satisfy the conditions for inclusion in the uniform luminance value area. The luminance value of this pixel is therefore likely affected by noise.

This conclusion is possible because the surrounding pixels are visually within the same region, and the luminance value of the pixels offset one pixel vertically from pixel 9 is different from the luminance value of pixel 9. The luminance value of pixel 9 can therefore be concluded to be due to noise.

To correct the color difference value, the color difference values are in a continuously increasing state through the range of smooth pixel luminance values from the trailing edge to pixel 8, and pixels with minimal change in the color difference value cannot be detected.

Therefore, as shown in FIG. 24c, the color difference values shown in FIG. 24b are output without correcting the color difference values. There is, of course, no improvement in image quality. In other words, because noise is contained in the luminance value, the range of smooth luminance values cannot be correctly detected, and correction of the color difference values is therefore not possible.

This is compensated for in the present embodiment by passing the luminance values through a low-pass filter 12 to reduce the noise component in the luminance values used for color difference value correction.

The luminance values after passing the luminance values through the low-pass filter 12 are shown in Table 4 column E, and are graphed in FIG. 24d. Noise has been removed from the luminance value of pixel 9, which is now within the range of uniform luminance values. Note that the pixel positions of the leading edge and trailing edge are the same as those obtained with the luminance values of the source image when evaluated using the luminance values after low-pass filter processing at this time.

If the luminance value of the trailing edge is 146, the condition obtaining the uniform luminance value area is a range of consecutive pixels with a luminance value from 141 to 151 (146±Th1). As a result, the smooth range of luminance values is from the trailing edge to pixel 15. In other words, the color difference values of the source image from the trailing edge to pixel 15 continue to increase from the trailing edge, but the pixel position k2 at which the simple increase in color difference value ends can be detected at pixel 11. The color difference values from the trailing edge to pixel k2 are then corrected using the average of the color difference values from pixel position k2 to pixel 15. The result of this operation is shown in Table 4 column F and FIG. 24e.

If the luminance values are not filtered by the low-pass filter 12, however, there is no change in the color difference values and color bleeding remains uncorrected in the image. Reduced color bleeding and improved image quality can be obtained, however, by filtering the source image luminance values through the low-pass filter 12. By then executing the process of the vertical color difference corrector 6, image quality that is improved over that achieved by the first embodiment can be obtained.

It is to be noted that while an "image memory" is used as the storage means in the above embodiments, the invention shall not be so limited and other storage devices, including magnetic disks, optical disks, and external RAM, can also be used.

Furthermore, the video signal processed in the above embodiments comprises a luminance signal and color difference signals R-Y, B-Y, but the invention shall not be so limited. The video signal can be any signal expressing an image by a luminance signal and color difference signal. In the PAL signal format, the broadcast color difference signals R-Y, B-Y are stored in the image data storage means, and in the NTSC signal format the broadcast color difference signals I and Q are converted to color difference signals R-Y, B-Y before storage to the image data storage means. In addition, if the video signal is an RGB signal, color difference correction by the present invention is applied after conversion to a luminance signal and color difference signals, and the corrected signal may then be re-converted to an RGB signal before final output.

Both of the color difference signals R-Y, B-Y are described as being corrected in each of the above embodiments, but the invention shall not be so limited. For example, the invention can be comprised to correct only color difference signal R-Y to correct the pronounced color bleeding that appears in still images. Processing time can be halved in this case, and the processed image signal can be output faster. This method is therefore particularly effective when storing a continuous video signal input stream.

The color difference values of all pixels within the range of variable color difference values are corrected in the above embodiments, but the invention may also be configured to correct only part of the pixel values.

The color difference values at both the leading edge side and the trailing edge side are also corrected in the above embodiments, but the invention may also be configured to correct the color difference values on only one side.

Finally, the low-pass filter is used to process all luminance values in the eighth embodiment above, but it is also possible to filter the luminance values only when the color difference values cannot be corrected in the uniform luminance value range, and then apply the color difference value correction process again after filtering noise from the luminance values.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A video signal correction apparatus comprising:
    storage means for storing a luminance value and original color difference values for each pixel in an image;
    horizontal color difference correction means comprising:
        luminance change point detection means for detecting, by scanning the luminance values in a horizontal direction, an edge pixel at which the luminance value starts to change at a rate greater than a predetermined rate for a predetermined number of consecutive pixels;
        stable luminance area detection means for detecting a luminance stable area extending from said edge pixel, in which area the luminance value change is less than a predetermined range;
        unstable color difference area detection means for detecting a color difference unstable area extending from said edge pixel and terminating at a pixel within said luminance stable area;
        reference color difference value obtaining means for obtaining a reference color difference value using at least one color difference value from at least one pixel located outside and adjacent to said unstable color difference area; and
        color difference correction means for correcting the color difference value of at least one pixel in said unstable color difference area by replacing the original color difference value by said reference color difference value; and
    vertical color difference correction means for selecting a predetermined number of vertically aligned pixels within a range of predetermined luminance values and smoothing the color difference values of the selected pixels.

2. A video signal correction apparatus according to claim 1, wherein said vertical color difference correction means comprises:
    reading means for reading a luminance value of a predetermined number of vertically aligned pixels in which one pixel is defined as a target pixel;
    selecting means for selecting pixels having a luminance value, deviated within a predetermined deviation range, from a luminance value Yh of said target pixel;
    averaging means for obtaining an average color difference value of the color difference values of the selected pixels; and
    replacing means for replacing the average color difference value with the color difference value of said target pixel.

3. A video signal correction apparatus according to claim 2, wherein said predetermined deviation range is determined by $Yh \pm \delta$, wherein $\delta$ is a predetermined constant.

4. A video signal correction apparatus according to claim 2, wherein said predetermined deviation range is determined by taking an absolute value of a difference between Yh and the luminance value of one vertically aligned pixel and detecting whether or not said difference is within Y% of said Yh.

5. A video signal correction apparatus according to claim 1, wherein said color difference correction means corrects the color difference value of all the pixels in said unstable color difference area by replacing the original color difference value thereof by said reference color difference value.

6. A video signal correction apparatus according to claim 1, wherein said color difference correction means corrects the color difference value of the pixels in two regions such that:
    the pixels in a first region, which extends from one end pixel, remote from said edge pixel, of said unstable color difference area to an intermediate pixel in said unstable color difference area, are corrected by replacing the original color difference value thereof by said reference color difference value; and
    the pixels in a second region, which extends from said intermediate pixel to said edge pixel, are corrected so as to change approximately linearly in said second region.

7. A video signal correction apparatus according to claim 1, further comprising a low pass filter between said storage means and said horizontal color difference correction means.

8. A video signal correction apparatus according to claim 1, further comprising a scanning direction selecting means for alternately selecting forward and reverse horizontal scanning directions.

9. A video signal correction apparatus according to claim 1, wherein said luminance change point detection means comprises:
    leading edge pixel detection means for detecting a leading edge pixel at which the luminance value starts to change at a rate greater than a predetermined rate for a predetermined number of consecutive pixels; and
    trailing edge pixel detection means for detecting a trailing edge pixel at which the luminance value stops changing at a rate greater than a predetermined rate, wherein an area defined between the leading and trailing edge pixels is a boundary between two colors.

10. A video signal correction apparatus according to claim 9, wherein said stable luminance area detection means comprises:
    leading edge side stable luminance area detection means for detecting a leading edge said luminance stable area extending from said leading edge pixel; and
    trailing edge side stable luminance area detection means for detecting a trailing edge side luminance stable area extending from said trailing edge pixel.

11. A video signal correction apparatus according to claim 10, wherein said unstable color difference area detection means comprises:
    leading edge side unstable color difference area detection means for detecting a leading edge side color difference unstable area extending from said leading edge pixel and terminating at a pixel within said leading edge side luminance stable area; and
    trailing edge side unstable color difference area detection means for detecting a trailing edge side color difference unstable area extending from said trailing edge pixel and terminating at a pixel within said trailing edge side luminance stable area.

12. A video signal correction apparatus according to claim 11, wherein said reference color difference value obtaining means comprises:
    leading side reference color difference value obtaining means for obtaining a leading side reference color difference value using at least one color difference value from at least one pixel located outside and adjacent to said leading side unstable color difference area; and trailing side reference color difference value obtaining means for obtaining a trailing side reference color difference value using at least one color difference value from at least one pixel located outside and adjacent to said trailing side unstable color difference area.

13. A video signal correction apparatus according to claim 12, wherein said color difference correction means comprises:

leading side color difference correction means for correcting the color difference value of at least one pixel in said leading side unstable color difference area by replacing the original color difference value thereof by said leading side reference color difference value; and trailing side color difference correction means for correction the color difference value of at least one pixel in said trailing side unstable color difference area by replacing the original color difference value thereof by said trailing side reference color difference value.

14. A video signal correction apparatus according to claim 13, wherein said leading side color difference correction means corrects the color difference value of all the pixels in said leading side unstable color difference area by replacing the original color difference value thereof by said leading side reference color difference value; and wherein said trailing side color difference correction means corrects the color difference value of all the pixels in said trailing side unstable color difference area by replacing the original color difference value thereof by said trailing side reference color difference value.

15. A video signal correction apparatus according to claim 13, wherein said leading color difference correction means corrects the color difference value of the pixels in two regions such that;

the pixels in a first region, which extends from one end pixel, remote from said leading edge pixel, of said leading side unstable color difference area to an intermediate pixel in said leading side unstable color difference area, are corrected by replacing the original color difference value thereof by said leading side reference color difference value; and the pixels in a second region, which extends from said intermediate pixel to said leading edge pixel, are corrected so as to change approximately linearly in said second region, and wherein said trailing color difference correction means corrects the color difference value of the pixels in said two regions such that;

the pixels in a third region, which extends from one end pixel, remote from said trailing edge pixel, of said trailing side unstable color difference area to an intermediate pixel in said trailing side unstable color difference area, are corrected by replacing the original color difference value thereof by said trailing side reference color difference value; and the pixels in a fourth region, which extends from said intermediate pixel to said trailing edge pixel, are corrected so as to change approximately linearly in said fourth region.

16. A video signal correction apparatus according to claim 9, wherein said horizontal color difference correction means comprises an interpolation means for linearly changing the color difference value between said leading edge and said trailing edge.

17. A video signal correction apparatus comprising:

a storage means that stores a luminance value and original color difference values for each pixel in an image;

a horizontal color difference corrector comprising:

a luminance change point detector that detects, by scanning the luminance values in a horizontal direction, an edge pixel at which the luminance value starts to change at a rate greater than a predetermined rate for a predetermined number of consecutive pixels;

a stable luminance area detector that detects a luminance stable area extending from said edge pixel, the luminance value change being less than a predetermined range within said luminance stable area;

an unstable color difference area detector that detects a color difference unstable area extending from said edge pixel and terminating at a pixel within said luminance stable area;

a reference color difference value calculator that calculates a reference color difference value using at least one color difference value from at least one pixel located outside and adjacent to said unstable color difference area; and a color difference corrector that corrects the color difference value of at least one pixel in said unstable color difference area by replacing the original color difference value by said reference color difference value; and a vertical color difference corrector that selects a predetermined number of vertically aligned pixels within a range of predetermined luminance values and smooths the color difference values of the selected pixels.

18. The video signal correction apparatus according to claim 17, wherein said vertical color difference corrector comprises:

a reader that reads a luminance value of a predetermined number of vertically aligned pixels in which one pixel is defined as a target pixel;

a selector that selects pixels having a luminance value which deviates, within a predetermined range, from a luminance value of said target pixel;

an average calculator that obtains an average color difference value of the color difference values of the selected pixels; and a replacement device that replaces the average color difference value with the color difference value of said target pixel.

19. The video signal correction apparatus according to claim 17, wherein said color difference corrector corrects the color difference value of the pixels in two regions such that:

the pixels in a first region, that extends from one end pixel, spaced from said edge pixel, of said unstable color difference region to an intermediate pixel within said unstable color difference region, are corrected by replacing the original color difference values by said reference color difference values; and the pixels in a second region, that extends from said intermediate pixel to said edge pixel, are corrected so as to change approximately linearly in said second region.

20. The video signal correction apparatus according to claim 17, wherein said luminance change point detector comprises:

a leading edge pixel detector that detects a leading edge pixel, at which the luminance value starts to change at a rate greater than a predetermined rate for a predetermined number of consecutive pixels; and a trailing edge pixel detector that detects a trailing edge pixel at which the luminance value stops changing at a rate greater than a predetermined rate, wherein an area defined between the leading and trailing edge pixels is a boundary between two colors.

* * * * *

UNITED STATES PATENT AND TRADEMARK OFFICE
CERTIFICATE OF CORRECTION

PATENT NO. : 5,418,574
DATED : May 23, 1995
INVENTOR(S) : Y. Miyabata, et. al.

It is certified that error appears in the above-indentified patent and that said Letters Patent is hereby corrected as shown below:

Title page, item [21], line 1, change "133,202" to -- 133,302--.
Column 6, line 1, change "values" to --value--.
Column 35, line 53, change "media" to --median--.

Signed and Sealed this

Twenty-fourth Day of October, 1995

Attest:

BRUCE LEHMAN

Attesting Officer

Commissioner of Patents and Trademarks